US011898511B2

(12) United States Patent
Aoki

(10) Patent No.: US 11,898,511 B2
(45) Date of Patent: Feb. 13, 2024

(54) CONTROL DEVICE FOR INTERNAL COMBUSTION ENGINE AND CATALYST ABNORMALITY DIAGNOSIS METHOD

(71) Applicant: TOYOTA JIDOSHA KABUSHIKI KAISHA, Toyota (JP)

(72) Inventor: Keiichiro Aoki, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/316,172

(22) Filed: May 11, 2023

(65) Prior Publication Data

US 2024/0018919 A1 Jan. 18, 2024

(30) Foreign Application Priority Data

Jul. 13, 2022 (JP) ................................ 2022-112605

(51) Int. Cl.
*F02D 41/02* (2006.01)
*F01N 11/00* (2006.01)

(52) U.S. Cl.
CPC ........ *F02D 41/0295* (2013.01); *F01N 11/007* (2013.01)

(58) Field of Classification Search
CPC ............... F01N 11/007; F01N 2550/02; F01N 2900/0416; F01N 2560/14; F01N 2560/025
See application file for complete search history.

(56) References Cited

U.S. PATENT DOCUMENTS

2009/0314268 A1* 12/2009 Fujiwara ............... F02D 41/148 123/703
2012/0031075 A1* 2/2012 Odendall .............. F01N 11/007 60/274
2015/0086428 A1 3/2015 Kitaura et al.
2015/0322878 A1* 11/2015 Okazaki .............. F02D 41/0295 60/285
2016/0377008 A1* 12/2016 Okazaki .................... F01N 9/00 701/104
2017/0058749 A1* 3/2017 Miyamoto ............ F01N 11/005
2021/0199041 A1* 7/2021 Furui .................. F02D 41/2454

FOREIGN PATENT DOCUMENTS

JP 2008-128110 A 6/2008
JP 2015-086861 A 5/2015
JP 2017-008853 A 1/2017

* cited by examiner

*Primary Examiner* — Anthony Ayala Delgado
(74) *Attorney, Agent, or Firm* — Finnegan, Henderson, Farabow, Garrett & Dunner, LLP

(57) ABSTRACT

A control device for an internal combustion engine includes an electronic control unit that controls the air-fuel ratio of incoming exhaust gas flowing into a catalyst. The electronic control unit performs oxygen amount variation control in which a target air-fuel ratio for the incoming exhaust gas is switched between a rich set air-fuel ratio and a lean set air-fuel ratio. The electronic control unit switches the target air-fuel ratio to the rich set air-fuel ratio when an air-fuel ratio detected by an air-fuel ratio sensor is equal to or higher than a predetermined oxygen saturation determination air-fuel ratio. The oxygen saturation determination air-fuel ratio is leaner than an oxygen depletion determination air-fuel ratio and richer than the stoichiometric air-fuel ratio.

5 Claims, 12 Drawing Sheets

CONTROL DEVICE FOR INTERNAL COMBUSTION ENGINE AND CATALYST ABNORMALITY DIAGNOSIS METHOD

CROSS-REFERENCE TO RELATED APPLICATION

This application claims priority to Japanese Patent Application No. 2022-112605 filed on Jul. 13, 2022, incorporated herein by reference in its entirety.

BACKGROUND

1. Technical Field

The present disclosure relates to control devices for internal combustion engines and catalyst abnormality diagnosis methods.

2. Description of Related Art

It is conventionally known to place a catalyst capable of storing oxygen in an exhaust passage of an internal combustion engine to control hydrocarbons (HC), carbon monoxide (CO), nitrogen oxides (NOx), etc. in exhaust gas (e.g., Japanese Unexamined Patent Application Publication No. 2015-086861 (JP 2015-086861 A), Japanese Unexamined Patent Application Publication No. 2017-008853 (JP 2017-008853 A), and Japanese Unexamined Patent Application Publication No. 2008-128110 (JP 2008-128110 A)). The higher the oxygen storage capacity of a catalyst, the more oxygen the catalyst can store, and the higher the emissions control performance of the catalyst.

However, the maximum oxygen storage capacity of a catalyst may decrease with long-term use etc. JP 2015-086861 A describes that the maximum oxygen storage capacity of a catalyst is calculated in order to diagnose such an abnormality in the catalyst, and whether there is an abnormality in the catalyst is determined based on the calculated maximum oxygen storage capacity.

When calculating the maximum oxygen storage capacity of a catalyst, the air-fuel ratio of incoming exhaust gas flowing into the catalyst is controlled based on an output from an air-fuel ratio sensor disposed downstream of the catalyst so that the catalyst changes between an oxygen depleted state and an oxygen saturated state. At this time, in an internal combustion engine described in JP 2015-086861 A, when the air-fuel ratio detected by an air-fuel ratio sensor disposed downstream of the catalyst has increased to a lean determination air-fuel ratio that is leaner than the stoichiometric air-fuel ratio, it is determined that the amount of oxygen stored in the catalyst has reached the maximum oxygen storage capacity, and a target air-fuel ratio for the incoming exhaust gas is switched from a lean set air-fuel ratio to a rich set air-fuel ratio.

SUMMARY

However, when an oxygen depleted region is formed in a catalyst, a water-gas shift reaction and a steam reforming reaction occur in the oxygen depleted region. When the catalyst changes from the oxygen depleted state to the oxygen saturated state, hydrogen produced by these reactions flows out of the catalyst, and an output from an air-fuel ratio sensor located downstream of the catalyst deviates to the rich side. In this case, in the method described in JP 2015-086861 A, the timing of determining that the amount of oxygen stored in the catalyst has reached the maximum oxygen storage capacity is delayed, and exhaust emissions may deteriorate.

Even when a diagnosis of an abnormality in the catalyst is not performed, air-fuel ratio control for changing the catalyst between the oxygen depleted state and the oxygen saturated state may be performed as in an internal combustion engine described in JP 2017-008853 A. In this case as well, the same problem as that described above occurs, and exhaust emissions may deteriorate due to hydrogen.

In view of the above problem, it is an object of the present disclosure to reduce deterioration of exhaust emissions due to hydrogen when changing a catalyst disposed in an exhaust passage of an internal combustion engine between the oxygen depleted state and the oxygen saturated state.

The gist of the present disclosure is as follows.

A control device for an internal combustion engine according to a first aspect of the present disclosure includes: a catalyst located in an exhaust passage and configured to store oxygen; an air-fuel ratio sensor configured to detect an air-fuel ratio of exhaust gas flowing out of the catalyst; and one or more electronic control units configured to control an air-fuel ratio of incoming exhaust gas flowing into the catalyst. The one or more electronic control units are configured to perform oxygen amount variation control in which a target air-fuel ratio for the incoming exhaust gas is switched between a rich set air-fuel ratio that is richer than a stoichiometric air-fuel ratio and a lean set air-fuel ratio that is leaner than the stoichiometric air-fuel ratio. The one or more electronic control units are configured to set the target air-fuel ratio to the lean set air-fuel ratio when the air-fuel ratio detected by the air-fuel ratio sensor is equal to or less than a predetermined oxygen depletion determination air-fuel ratio in the oxygen amount variation control. The one or more electronic control units are configured to set the target air-fuel ratio to the rich set air-fuel ratio when the air-fuel ratio detected by the air-fuel ratio sensor is equal to or higher than a predetermined oxygen saturation determination air-fuel ratio in the oxygen amount variation control. The oxygen depletion determination air-fuel ratio is an air-fuel ratio richer than the stoichiometric air-fuel ratio. The oxygen saturation determination air-fuel ratio is leaner than the oxygen depletion determination air-fuel ratio and richer than the stoichiometric air-fuel ratio.

In the control device according to the first aspect, the one or more electronic control units may be configured to perform an abnormality diagnosis in which a maximum oxygen storage capacity of the catalyst is calculated based on an amount of oxygen stored in the catalyst when the target air-fuel ratio is maintained at the lean set air-fuel ratio in the oxygen amount variation control and whether the catalyst is abnormal is determined based on the maximum oxygen storage capacity.

In the control device according to the first aspect, the one or more electronic control units may be configured to perform the oxygen amount variation control when the abnormality diagnosis is performed, and may be configured to perform slightly rich control when the abnormality diagnosis is not performed, the slightly rich control being control in which the air-fuel ratio of the incoming exhaust gas is controlled in such a manner that the air-fuel ratio detected by the air-fuel ratio sensor is maintained at a slightly rich air-fuel ratio that is richer than the stoichiometric air-fuel ratio.

In the control device according to the first aspect, the one or more electronic control units may be configured to: calculate the maximum oxygen storage capacity of the catalyst based on the amount of oxygen stored in the catalyst when the target air-fuel ratio is maintained at the lean set air-fuel ratio in the oxygen amount variation control and an amount of oxygen released from the catalyst when the target air-fuel ratio is maintained at the rich set air-fuel ratio in the oxygen amount variation control; and determine that the catalyst is abnormal when the maximum oxygen storage capacity is less than a predetermined threshold. The one or more electronic control units may be configured to determine that the catalyst is abnormal when the maximum oxygen storage capacity is equal to or higher than the threshold and a ratio of a period during which the air-fuel ratio detected by the air-fuel ratio sensor is maintained near the stoichiometric air-fuel ratio to a period during which the target air-fuel ratio is maintained at the rich set air-fuel ratio in the oxygen amount variation control is less than a predetermined value.

A catalyst abnormality diagnosis method according to a second aspect of the present disclosure is a method for diagnosing an abnormality in a catalyst located in an exhaust passage of an internal combustion engine and configured to absorb oxygen. The catalyst abnormality diagnosis method includes: detecting an air-fuel ratio of exhaust gas flowing out of the catalyst; setting a target air-fuel ratio for incoming exhaust gas flowing into the catalyst to a lean set air-fuel ratio that is leaner than a stoichiometric air-fuel ratio when the detected air-fuel ratio is equal to or less than a predetermined oxygen depletion determination air-fuel ratio; setting the target air-fuel ratio to a rich set air-fuel ratio that is richer than the stoichiometric air-fuel ratio when the detected air-fuel ratio is equal to or higher than a predetermined oxygen saturation determination air-fuel ratio; calculating a maximum oxygen storage capacity of the catalyst based on an amount of oxygen stored in the catalyst when the target air-fuel ratio is maintained at the lean set air-fuel ratio; and determining whether the catalyst is abnormal based on the maximum oxygen storage capacity. The oxygen depletion determination air-fuel ratio is an air-fuel ratio richer than the stoichiometric air-fuel ratio, and the oxygen saturation determination air-fuel ratio is leaner than the oxygen depletion determination air-fuel ratio and richer than the stoichiometric air-fuel ratio.

The present disclosure can reduce deterioration of exhaust emissions due to hydrogen when changing a catalyst disposed in an exhaust passage of an internal combustion engine between an oxygen depleted state and an oxygen saturated state.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described in detail with reference to the drawings. In the following description, like constituent elements are denoted by like signs.

First Embodiment

A first embodiment of the present disclosure will be described with reference to FIGS. 1 to 8.

Overall Configuration of Internal Combustion Engine

Figure 1:
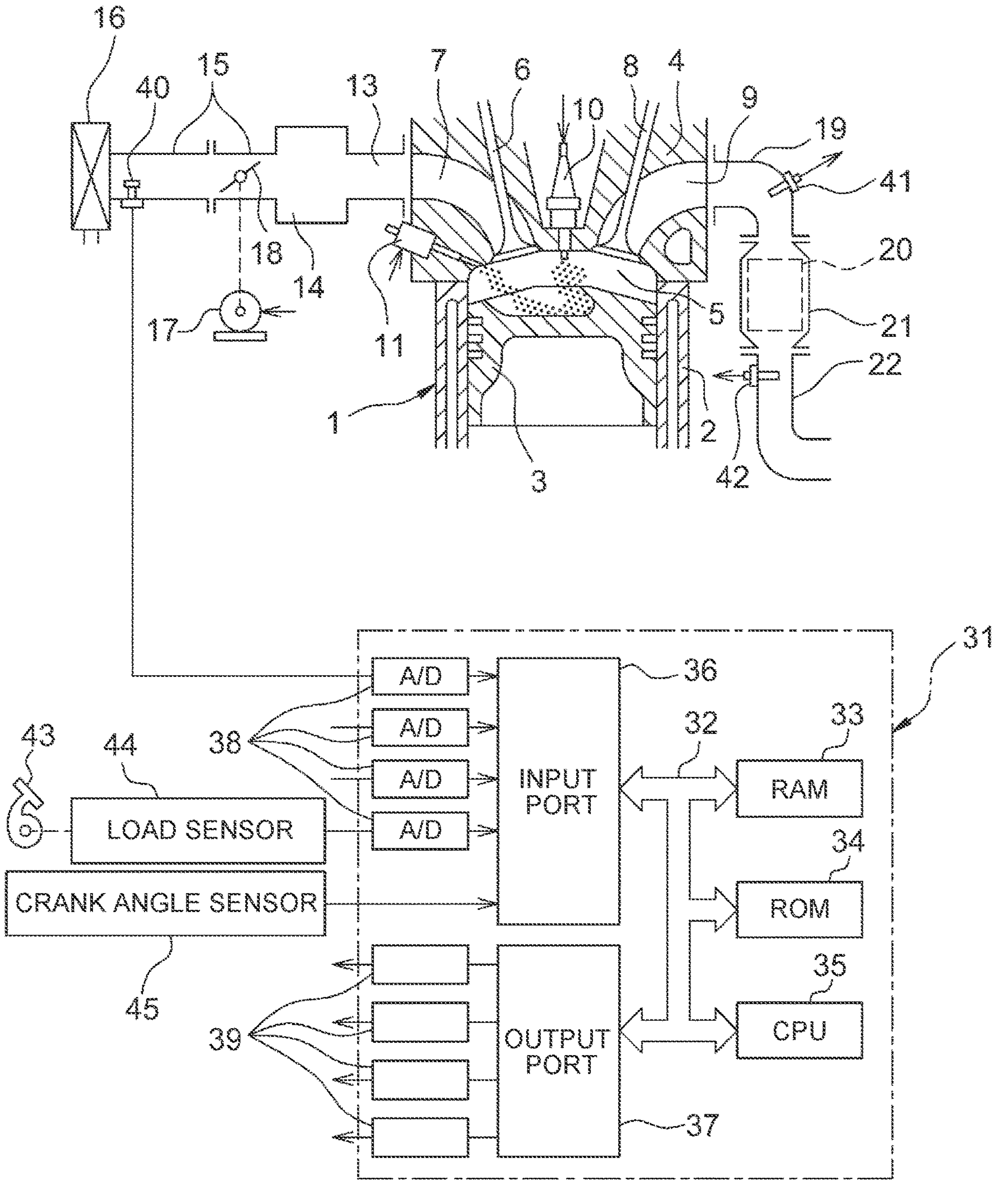
FIG. 1 schematically shows an internal combustion engine to which a control device for an internal combustion engine according to a first embodiment of the present disclosure is applied.

FIG. 1 schematically shows an internal combustion engine to which a control device for an internal combustion engine according to the first embodiment of the present disclosure is applied. The internal combustion engine shown in FIG. 1 is a spark-ignition internal combustion engine. The internal combustion engine is mounted on a vehicle, and is used as a power source for the vehicle.

The internal combustion engine includes an engine body 1 that includes a cylinder block 2 and a cylinder head 4. A plurality of (e.g., four) cylinders is formed inside the cylinder block 2. A piston 3 that reciprocates in the axial direction of a cylinder is disposed in each cylinder. A combustion chamber 5 is formed between the piston 3 and the cylinder head 4.

An intake port 7 and an exhaust port 9 are formed in the cylinder head 4. The intake port 7 and the exhaust port 9 are connected to the combustion chamber 5.

The internal combustion engine further includes an intake valve 6 and an exhaust valve 8 that are disposed in the cylinder head 4. The intake valve 6 opens and closes the intake port 7. The exhaust valve 8 opens and closes the exhaust port 9.

The internal combustion engine further includes a spark plug 10 and a fuel injection valve 11. The spark plug 10 is disposed in the central portion of the inner wall surface of the cylinder head 4, and generates a spark in response to an ignition signal. The fuel injection valve 11 is disposed in the peripheral portion of the inner wall surface of the cylinder head 4, and injects fuel into the combustion chamber 5 in response to an injection signal. In the present embodiment, gasoline with a stoichiometric air-fuel ratio of 14.6 is used as fuel to be supplied to the fuel injection valve 11.

The internal combustion engine further includes an intake manifold 13, a surge tank 14, an intake pipe 15, an air cleaner 16, and a throttle valve 18. The intake port 7 of each cylinder is connected to the surge tank 14 via a corresponding intake manifold 13. The surge tank 14 is connected to the air cleaner 16 via the intake pipe 15. The intake port 7, the intake manifold 13, the surge tank 14, the intake pipe 15, etc. form an intake passage that guides air into the combustion chamber 5. The throttle valve 18 is disposed in the intake pipe between the surge tank 14 and the air cleaner 16, and is driven by a throttle valve drive actuator 17 (e.g., a direct current (DC) motor). The throttle valve 18 is rotated by the throttle valve drive actuator 17. The throttle valve 18 can thus change the opening area of the intake passage according to the opening degree of the throttle valve 18.

The internal combustion engine further includes an exhaust manifold 19, a catalyst 20, a casing 21, and an exhaust pipe 22. The exhaust port 9 of each cylinder is connected to the exhaust manifold 19. The exhaust manifold 19 has a plurality of branches connected to the exhaust ports 9, and a collection portion where the branches are combined. The collection portion of the exhaust manifold 19 is connected to the casing 21 containing the catalyst 20. The casing 21 is connected to the exhaust pipe 22. The exhaust port 9, the exhaust manifold 19, the casing 21, the exhaust pipe 22, etc. form an exhaust passage that discharges exhaust gas generated by combustion of an air-fuel mixture in the combustion chamber 5.

The vehicle equipped with the internal combustion engine is provided with an electronic control unit (ECU) 31. As shown in FIG. 1, the ECU 31 is a digital computer, and includes a random access memory (RAM) 33, a read-only memory (ROM) 34, a central processing unit (CPU; microprocessor) 35, an input port 36, and an output port 37. The RAM 33, the ROM 34, the CPU 35, the input port 36, and the output port 37 are connected to each other via a bidirectional bus 32. Although one ECU 31 is provided in the present embodiment, a plurality of ECUs may be provided for each function.

The ECU 31 performs various types of control on the internal combustion engine based on, for example, outputs from various sensors installed in the vehicle or the internal combustion engine. Therefore, the outputs from the various sensors are sent to the ECU 31. In the present embodiment, outputs from an air flow meter 40, an upstream air-fuel ratio sensor 41, a downstream air-fuel ratio sensor 42, a load sensor 44, and a crank angle sensor 45 are sent to the ECU 31.

The air flow meter 40 is disposed in the intake passage of the internal combustion engine, specifically, in the intake pipe 15 upstream of the throttle valve 18. The air flow meter 40 detects the flow rate of air flowing through the intake passage. The air flow meter 40 is electrically connected to the ECU 31. An output from the air flow meter 40 is input to the input port 36 via a corresponding analog-to-digital (A/D) converter 38.

The upstream air-fuel ratio sensor 41 is disposed in the exhaust passage upstream of the catalyst 20, specifically, in the collection portion of the exhaust manifold 19. The upstream air-fuel ratio sensor 41 detects the air-fuel ratio of the exhaust gas flowing in the exhaust manifold 19, that is, the exhaust gas discharged from the cylinders of the internal combustion engine and flowing into the catalyst 20. The upstream air-fuel ratio sensor 41 is electrically connected to the ECU 31. An output from the upstream air-fuel ratio sensor 41 is input to the input port 36 via a corresponding A/D converter 38.

The downstream air-fuel ratio sensor 42 is disposed in the exhaust passage downstream of the catalyst 20, specifically, in the exhaust pipe 22. The downstream air-fuel ratio sensor 42 detects the air-fuel ratio of the exhaust gas flowing in the exhaust pipe 22, that is, the exhaust gas flowing out of the catalyst 20 (hereinafter also referred to as "outgoing exhaust gas"). The downstream air-fuel ratio sensor 42 is electrically connected to the ECU 31. An output from the downstream air-fuel ratio sensor 42 is input to the input port 36 via a corresponding A/D converter 38.

The load sensor 44 is connected to an accelerator pedal 43 in the vehicle equipped with the internal combustion engine, and detects the amount of depression of the accelerator pedal 43. The load sensor 44 is electrically connected to the ECU 31. An output from the load sensor 44 is input to the input port 36 via a corresponding A/D converter 38. The ECU 31 calculates an engine load based on the output from the load sensor 44.

The crank angle sensor 45 generates an output pulse every time a crankshaft of the internal combustion engine is rotated by a predetermined angle (e.g. 10 degrees). The crank angle sensor 45 is electrically connected to the ECU 31. An output from the crank angle sensor 45 is input to the input port 36. The ECU 31 calculates an engine speed based on the output from the crank angle sensor 45.

The output port 37 of the ECU 31 is connected to the spark plug 10, the fuel injection valve 11, and the throttle valve drive actuator 17 via corresponding drive circuits 39. The ECU 31 controls the spark plug 10, the fuel injection valve 11, and the throttle valve drive actuator 17. Specifically, the ECU 31 controls the ignition timing of the spark plug 10, the injection timing and injection amount of fuel that is injected from the fuel injection valve 11, and the opening degree of the throttle valve 18.

Although the internal combustion engine described above is a non-supercharged internal combustion engine that uses gasoline as fuel, the configuration of the internal combustion engine is not limited to the above configuration. Therefore, the specific configuration of the internal combustion engine, such as cylinder arrangement, manner of fuel injection, configuration of intake and exhaust systems, configuration of a valve train mechanism, and presence or absence of a supercharger, may be different from the configuration shown in FIG. 1. For example, the fuel injection valve 11 may be disposed so as to inject fuel into the intake port 7. The internal combustion engine may be provided with a configuration that recirculates exhaust gas recirculation (EGR) gas from the exhaust passage to the intake passage.

Catalyst

The catalyst 20 is disposed in the exhaust passage of the internal combustion engine, and is configured to control the exhaust gas flowing through the exhaust passage. In the present embodiment, the catalyst 20 is a three-way catalyst capable of storing oxygen and capable of controlling, for example, hydrocarbons (HC), carbon monoxide (CO), and nitrogen oxides (NOx) at the same time. The catalyst 20 includes a support (base) made of ceramic or metal, a noble metal having a catalytic action (e.g., platinum (Pt), palladium (Pd), or rhodium (Rh)), and a promoter having an oxygen storage capacity (e.g., ceria ($CeO_2$)). The noble metal and the promotor are supported on the support.

Figure 2:
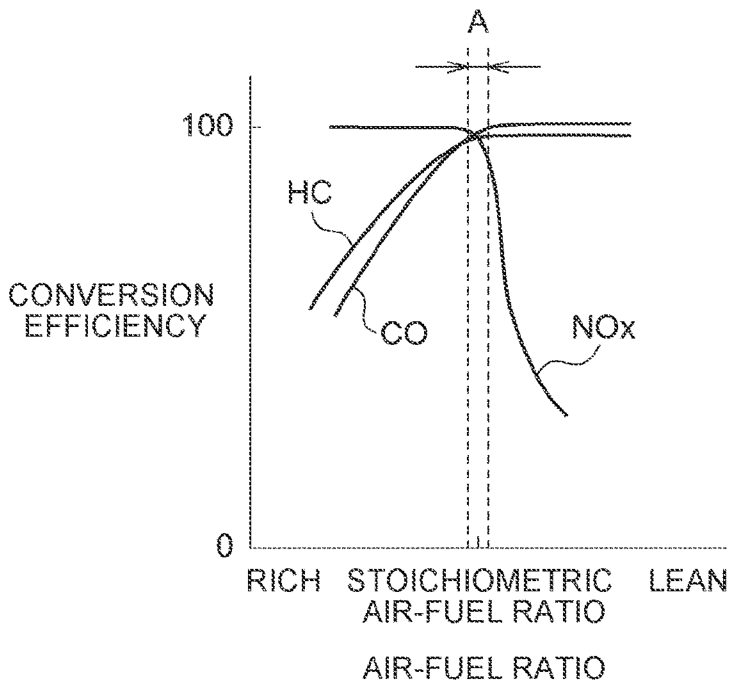
FIG. 2 is a graph showing an example of the control properties of a three-way catalyst.

FIG. 2 is a graph showing an example of the control properties of the three-way catalyst. As shown in FIG. 2, the HC, CO, and NOx conversion efficiencies of the three-way catalyst are very high when the air-fuel ratio of the exhaust gas flowing into the three-way catalyst is in a region around the stoichiometric air-fuel ratio (control window A in FIG. 2). Therefore, the catalyst 20 can effectively control HC, CO, and NOx when the air-fuel ratio of the exhaust gas is maintained near the stoichiometric air-fuel ratio.

The catalyst 20 stores or releases oxygen according to the air-fuel ratio of the exhaust gas by using the promoter. Specifically, the catalyst 20 stores excess oxygen from the exhaust gas when the air-fuel ratio of the exhaust gas is leaner than the stoichiometric air-fuel ratio. The catalyst 20 releases oxygen to help oxidize HC and CO when the air-fuel ratio of the exhaust gas is richer than the stoichiometric air-fuel ratio. As a result, the air-fuel ratio on the surface of the catalyst 20 is maintained near the stoichiometric air-fuel ratio even when the air-fuel ratio of the exhaust gas slightly deviates from the stoichiometric air-fuel ratio. HC, CO, and NOx are thus effectively controlled by the catalyst Air-Fuel Ratio Sensors The upstream air-fuel ratio sensor 41 and the downstream air-fuel ratio sensor 42 are disposed in the exhaust passage of the internal combustion engine. The downstream air-fuel ratio sensor 42 is disposed downstream of the upstream air-fuel ratio sensor 41. The upstream air-fuel ratio sensor 41 and the downstream air-fuel ratio sensor 42 are each configured to detect the air-fuel ratio of the exhaust gas flowing through the exhaust passage.

Figure 3:
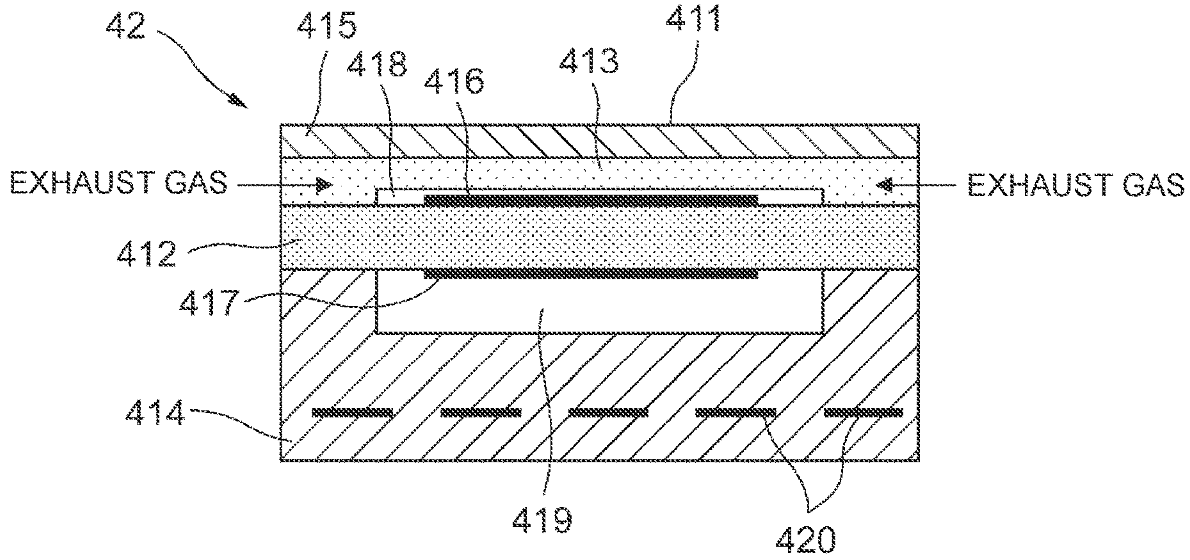
FIG. 3 is a partial sectional view of a downstream air-fuel ratio sensor.

FIG. 3 is a partial sectional view of the downstream air-fuel ratio sensor 42. Since the downstream air-fuel ratio sensor 42 has a known configuration, the configuration of the downstream air-fuel ratio sensor 42 will be only briefly described below. The upstream air-fuel ratio sensor 41 has the same configuration as the downstream air-fuel ratio sensor 42.

The downstream air-fuel ratio sensor 42 includes a sensor element 411 and heaters 420. In the present embodiment, the downstream air-fuel ratio sensor 42 is a stacked air-fuel ratio sensor formed by stacking a plurality of layers. As shown in FIG. 3, the sensor element 411 includes a solid electrolyte layer 412, a diffusion control layer 413, a first impermeable layer 414, a second impermeable layer 415, an exhaust-side electrode 416, and an atmosphere-side electrode 417. A measured gas chamber 418 is formed between the solid electrolyte layer 412 and the diffusion control layer 413. An atmosphere chamber 419 is formed between the solid electrolyte layer 412 and the first impermeable layer 414.

Exhaust gas is introduced into the measured gas chamber 418 via the diffusion control layer 413 as gas to be measured. The atmosphere is introduced into the atmosphere chamber 419. When a voltage is applied to the sensor element 411, oxide ions move between the exhaust-side electrode 416 and the atmosphere-side electrode 417 according to the air-fuel ratio of the exhaust gas on the exhaust-side electrode 416. As a result, an output current from the sensor element 411 changes according to the air-fuel ratio of the exhaust gas.

Figure 4:
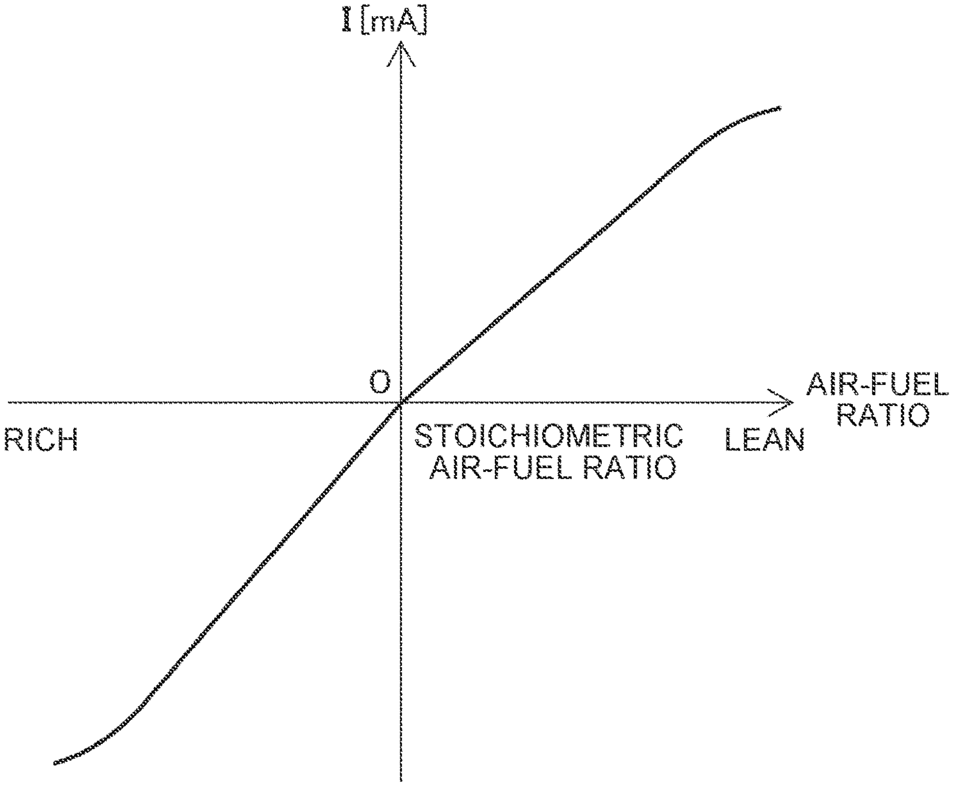
FIG. 4 is a graph showing the relationship between the air-fuel ratio of exhaust gas in the downstream air-fuel ratio sensor and the output current from a sensor element.

FIG. 4 is a graph showing the relationship between the air-fuel ratio of the exhaust gas in the downstream air-fuel ratio sensor 42 and the output current I from the sensor element 411. In the example shown in FIG. 4, a voltage of 0.45 V is applied to the sensor element 411. As can be seen from FIG. 4, the output current I is zero when the air-fuel ratio of the exhaust gas is the stoichiometric air-fuel ratio. In the downstream air-fuel ratio sensor 42, the output current I increases as the oxygen concentration of the exhaust gas increases, that is, as the air-fuel ratio of the exhaust gas becomes leaner. The downstream air-fuel ratio sensor 42 and the upstream air-fuel ratio sensor 41 having the same configuration as the downstream air-fuel ratio sensor 42 can therefore continuously (linearly) detect the air-fuel ratio of the exhaust gas.

In the present embodiment, limiting current air-fuel ratio sensors are used as the upstream air-fuel ratio sensor 41 and the downstream air-fuel ratio sensor 42. However, air-fuel ratio sensors other than limiting current air-fuel ratio sensors may be used as the upstream air-fuel ratio sensor 41 and the downstream air-fuel ratio sensor 42 as long as an output current from such air-fuel ratio sensors changes linearly with respect to the air-fuel ratio of the exhaust gas. The upstream air-fuel ratio sensor 41 and the downstream air-fuel ratio sensor 42 may be air-fuel ratio sensors having different structures.

Control Device for Internal Combustion Engine

Figure 5:
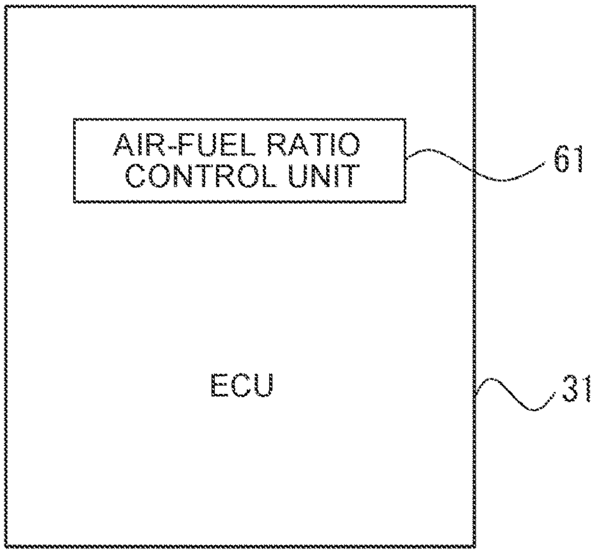
FIG. 5 is a functional block diagram of an electronic control unit (ECU) according to the first embodiment.

First, a control device for an internal combustion engine according to the first embodiment of the present disclosure will be described. In the present embodiment, the ECU 31 shown in FIG. 1 functions as the control device for an internal combustion engine. FIG. 5 is a functional block diagram of the ECU 31 according to the first embodiment. In the present embodiment, the ECU 31 includes an air-fuel ratio control unit 61. The air-fuel ratio control unit 61 is a functional module that is implemented by the CPU 35 of the ECU 31 executing programs stored in the ROM 34 of the ECU 31.

The air-fuel ratio control unit 61 controls the air-fuel ratio of the exhaust gas flowing into the catalyst 20 (hereinafter referred to as "incoming exhaust gas"). In the present embodiment, the air-fuel ratio control unit 61 controls the air-fuel ratio of the incoming exhaust gas based on outputs from the upstream air-fuel ratio sensor 41 and the downstream air-fuel ratio sensor 42. Specifically, the air-fuel ratio control unit 61 sets a target air-fuel ratio for the incoming exhaust gas based on the output from the downstream air-fuel ratio sensor 42, and feedback-controls the amount of fuel to be supplied to the combustion chamber 5 so that an output air-fuel ratio from the upstream air-fuel ratio sensor 41 matches the target air-fuel ratio. The "output air-fuel ratio" means an air-fuel ratio corresponding to an output value from an air-fuel ratio sensor, that is, an air-fuel ratio detected by an air-fuel ratio sensor.

The air-fuel ratio control unit 61 may control the amount of fuel to be supplied to the combustion chamber 5 so that the air-fuel ratio of the incoming exhaust gas matches the target air-fuel ratio without using the upstream air-fuel ratio sensor 41. In this case, the upstream air-fuel ratio sensor 41 is omitted from the internal combustion engine, and the air-fuel ratio control unit 61 calculates the amount of fuel to be supplied to the combustion chamber 5 from the amount of intake air, the engine speed, and the target air-fuel ratio so that the ratio of air and fuel to be supplied to the combustion chamber 5 matches the target air-fuel ratio.

In order to maintain the oxygen storage capacity of the catalyst 20, it is desirable to change the amount of oxygen stored in the catalyst 20 so that the amount of oxygen stored in the catalyst 20 is not maintained constant. Therefore, in the present embodiment, the air-fuel ratio control unit 61 performs oxygen amount variation control. The oxygen amount variation control is control in which the air-fuel ratio control unit 61 switches the target air-fuel ratio for the incoming exhaust gas between a rich set air-fuel ratio richer than the stoichiometric air-fuel ratio and a lean set air-fuel ratio leaner than the stoichiometric air-fuel ratio so that the catalyst 20 changes between the oxygen depleted state and the oxygen saturated state. In the oxygen amount variation control, the air-fuel ratio control unit 61 sets the target air-fuel ratio for the incoming exhaust gas to the lean set air-fuel ratio when it is determined that the amount of oxygen stored in the catalyst 20 has decreased and the catalyst 20 has gone into the oxygen depleted state, and sets the target air-fuel ratio for the incoming exhaust gas to the rich set air-fuel ratio when it is determined that the amount of oxygen stored in the catalyst 20 has increased and the catalyst 20 has gone into the oxygen saturated state. Therefore, in the oxygen amount variation control, the amount of oxygen stored in the catalyst 20 changes between zero and the maximum oxygen storage capacity.

When the catalyst 20 is in the oxygen depleted state, the air-fuel ratio of the exhaust gas flowing out of the catalyst 20 is richer than the stoichiometric air-fuel ratio. When the catalyst 20 is in the oxygen saturated state, the air-fuel ratio of the exhaust gas flowing out of the catalyst 20 is leaner than the stoichiometric air-fuel ratio. Therefore, it is determined that the catalyst 20 is in the oxygen depleted state when the value of the output air-fuel ratio from the downstream air-fuel ratio sensor 42 located downstream of the catalyst 20 is richer than the stoichiometric air-fuel ratio. It is also determined that the catalyst 20 is in the oxygen saturated state when the value of the output air-fuel ratio from the downstream air-fuel ratio sensor 42 is leaner than the stoichiometric air-fuel ratio.

When the catalyst 20 is depleted of oxygen, however, the following water-gas shift reaction (1) and steam reforming reaction (2) occur to produce hydrogen in the catalyst 20.

$$CO+H_2O\rightarrow H_2+CO_2 \quad (1)$$

$$HC+H_2O\rightarrow CO+H_2 \quad (2)$$

As a result, the exhaust gas containing hydrogen flows out of the catalyst 20 and into the downstream air-fuel ratio sensor 42. At this time, since the molecular weight of hydrogen is less than the molecular weight of oxygen, hydrogen in the exhaust gas passes through the diffusion control layer 413 and reaches the exhaust-side electrode 416 faster than oxygen in the exhaust gas. Therefore, the oxygen concentration of the exhaust gas on the exhaust-side electrode 416 becomes lower than the oxygen concentration of the exhaust gas in the exhaust passage. As a result, a deviation occurs in the output from the downstream air-fuel ratio sensor 42, and the output from the downstream air-fuel ratio sensor 42 deviates to a richer side from the actual value.

Figure 6A:
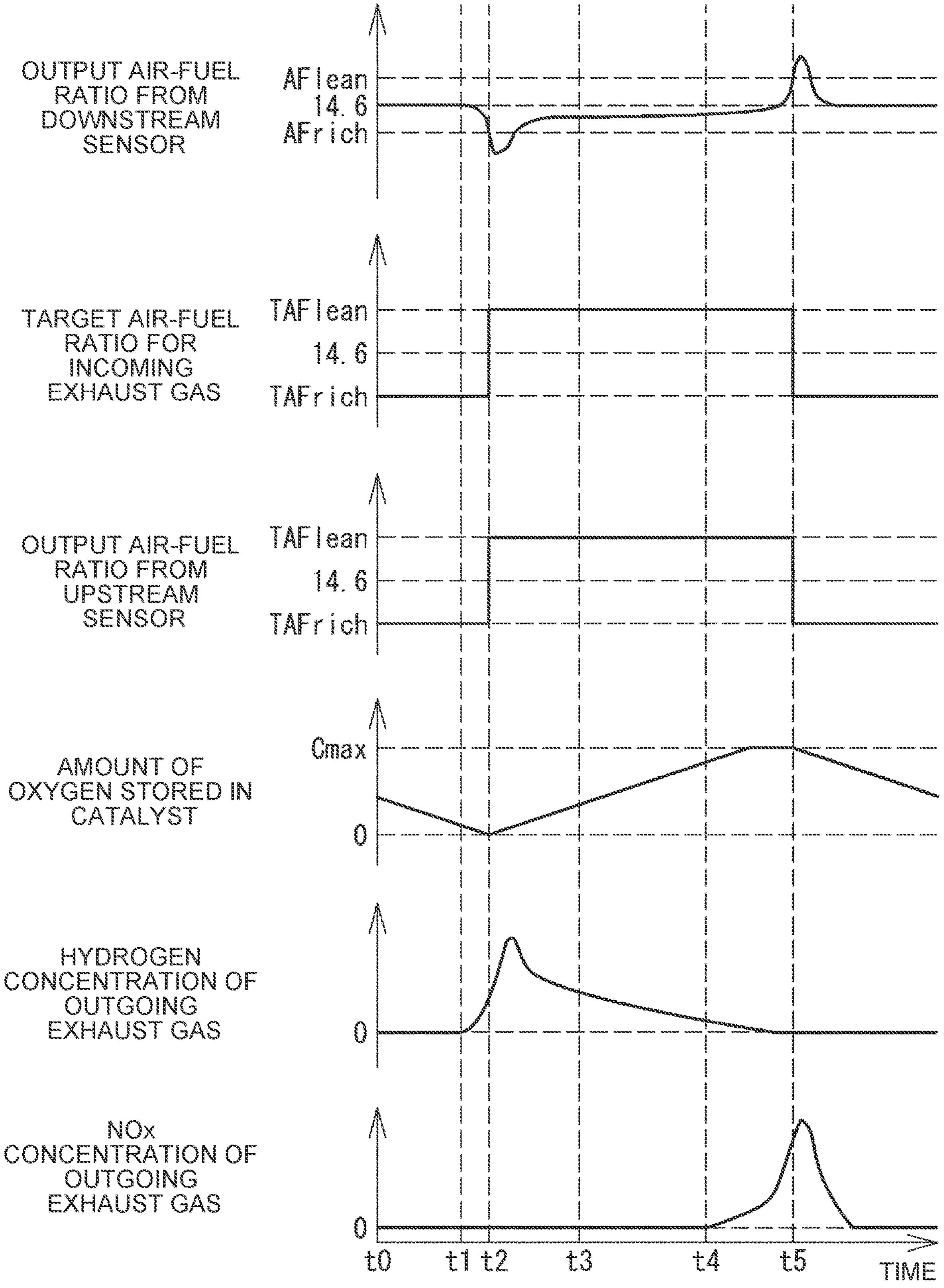
FIG. 6A is a time chart of various parameters when the air-fuel ratio of incoming exhaust gas is switched between an air-fuel ratio richer than the stoichiometric air-fuel ratio and an air-fuel ratio leaner than the stoichiometric air-fuel ratio.

FIG. 6A is a time chart of various parameters when the air-fuel ratio of the incoming exhaust gas is switched between an air-fuel ratio richer than the stoichiometric air-fuel ratio and an air-fuel ratio leaner than the stoichiometric air-fuel ratio. FIG. 6A shows, as the parameters, the output air-fuel ratio from the downstream air-fuel ratio sensor 42 (output air-fuel ratio from downstream sensor), the target air-fuel ratio for the incoming exhaust gas, the output air-fuel ratio from the upstream air-fuel ratio sensor 41 (output air-fuel ratio from upstream sensor), the amount of oxygen stored in the catalyst 20, the hydrogen concentration of the outgoing exhaust gas, and the NOx concentration of the outgoing exhaust gas.

Figure 6B:
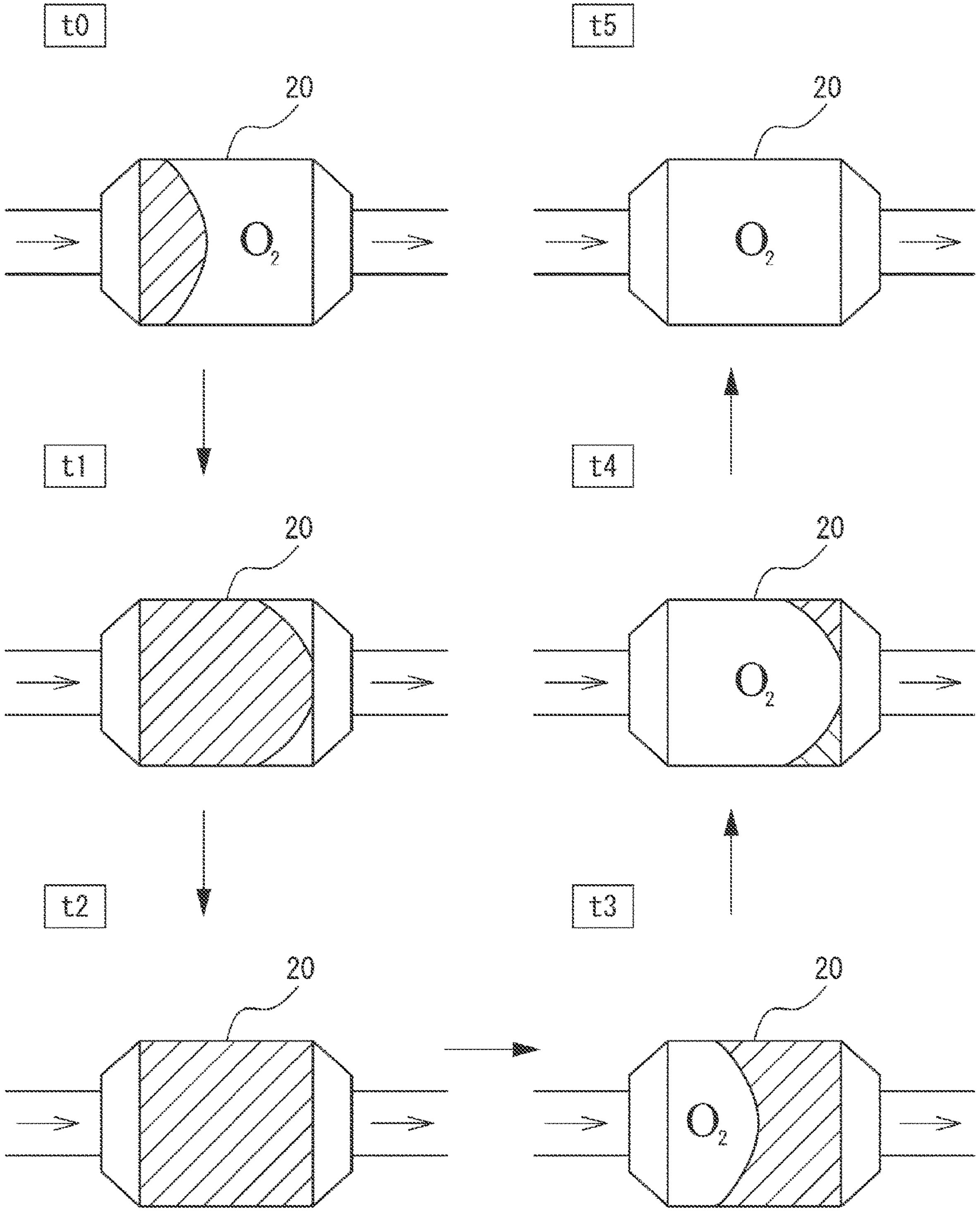
FIG. 6B schematically shows the oxygen storage state of a catalyst at each time in FIG. 6A.

FIG. 6B schematically shows the oxygen storage state of the catalyst 20 at each time (times t0 to t5) in FIG. 6A. In FIG. 6B, the oxygen storage state of the catalyst 20 is shown together with the direction in which the exhaust gas flows through the catalyst 20. The hatched portion of the catalyst 20 indicates an oxygen depleted region where oxygen has been depleted. The remaining portion of the catalyst 20 indicates a region filled with oxygen.

In this example, at time t0, the target air-fuel ratio for the incoming exhaust gas is set to a rich set air-fuel ratio TAFrich that is richer than the stoichiometric air-fuel ratio. When exhaust gas having a rich air-fuel ratio flows into the catalyst 20 filled with oxygen, the oxygen is gradually released from the upstream side of the catalyst 20. As a result, as shown in FIG. 6B, there is an oxygen depleted region in the upstream side of the catalyst 20 at time t0. In this case, since hydrogen produced in the oxygen depleted region is oxidized in the downstream side of the catalyst 20, almost no hydrogen flows out of the catalyst 20. Since HC, CO, and NOx in the exhaust gas are effectively controlled in the catalyst 20, the output air-fuel ratio from the downstream air-fuel ratio sensor 42 is maintained at the stoichiometric air-fuel ratio.

Thereafter, at time t1, most of the catalyst 20 becomes the oxygen depleted region, so that HC and CO flow out of the catalyst 20 and the output air-fuel ratio from the downstream air-fuel ratio sensor 42 starts to change to the rich side. In the example in FIG. 6A, when the output air-fuel ratio from the downstream air-fuel ratio sensor 42 reaches a rich determination air-fuel ratio AFrich that is richer than the stoichiometric air-fuel ratio at time t2, the target air-fuel ratio for the incoming exhaust gas is switched from the rich set air-fuel ratio TAFrich to a lean set air-fuel ratio TAFlean that is leaner than the stoichiometric air-fuel ratio. At time t2, as shown in FIG. 6B, the entire region of the catalyst 20 becomes the oxygen depleted region, and the amount of oxygen stored in the catalyst 20 becomes almost zero.

When exhaust gas with a lean air-fuel ratio flows into the catalyst 20 thus having been depleted of oxygen, the catalyst 20 is gradually filled with oxygen from the upstream side of the catalyst 20. As a result, at time t3, as shown in FIG. 6B, the upstream side of the catalyst 20 is filled with oxygen, and the oxygen depleted region remains in the downstream side of the catalyst 20. In this case, HC, CO, and NOx in the exhaust gas are effectively controlled in the catalyst 20. However, since hydrogen produced in the oxygen depleted region in the downstream side of the catalyst 20 flows out of the catalyst 20 into the downstream air-fuel ratio sensor 42, the output air-fuel ratio of the downstream air-fuel ratio sensor 42 has a value richer than the stoichiometric air-fuel ratio due to the hydrogen.

Thereafter, at time t4, most of the catalyst 20 is filled with oxygen, and NOx starts to flow out of the catalyst 20. Also at this time, hydrogen produced in the small oxygen depleted region remaining in the downstream side of the catalyst 20 flows out of the catalyst 20, and the output from the downstream air-fuel ratio sensor 42 is affected by the hydrogen.

In the example of FIG. 6A, when the output air-fuel ratio from the downstream air-fuel ratio sensor 42 reaches a lean determination air-fuel ratio AFlean at time t5, the target air-fuel ratio for the incoming exhaust gas is switched from the lean set air-fuel ratio TAFlean to the rich set air-fuel ratio TAFrich. However, since the output from the downstream air-fuel ratio sensor 42 had deviated to the rich side due to the hydrogen, the amount of oxygen stored the catalyst 20 reached the maximum oxygen storage capacity Cmax before time t5. As a result, the catalyst 20 is maintained in the oxygen saturated state for a longer period of time, and the amount of NOx emissions is increased. Therefore, there is room for improvement in the timing of switching the target air-fuel ratio for the incoming exhaust gas from the lean set air-fuel ratio TAFlean to the rich set air-fuel ratio TAFrich.

According to the present embodiment, in the oxygen amount variation control, the air-fuel ratio control unit 61 sets the target air-fuel ratio for the incoming exhaust gas to the lean set air-fuel ratio when the output air-fuel ratio from the downstream air-fuel ratio sensor 42 decreases to a predetermined oxygen depletion determination air-fuel ratio. The air-fuel ratio control unit 61 switches the target air-fuel ratio for the incoming exhaust gas from the lean set air-fuel ratio to the rich set air-fuel ratio when the output air-fuel ratio from the downstream air-fuel ratio sensor 42 increases to a predetermined oxygen saturation determination air-fuel ratio. The oxygen depletion determination air-fuel ratio is set to an air-fuel ratio richer than the stoichiometric air-fuel ratio, and the oxygen saturation determination air-fuel ratio is set to an air-fuel ratio leaner than the oxygen depletion determination air-fuel ratio and richer than the stoichiometric air-fuel ratio. The target air-fuel ratio for the incoming exhaust gas can thus be switched from the lean set air-fuel ratio to the rich set air-fuel ratio at an appropriate timing in view of the influence of hydrogen, and deterioration of exhaust emissions due to hydrogen can be reduced. The oxygen depletion determination air-fuel ratio corresponds to the rich determination air-fuel ratio AFrich in FIG. 6A.

Air-Fuel Ratio Control Using Time Chart

Figure 7:
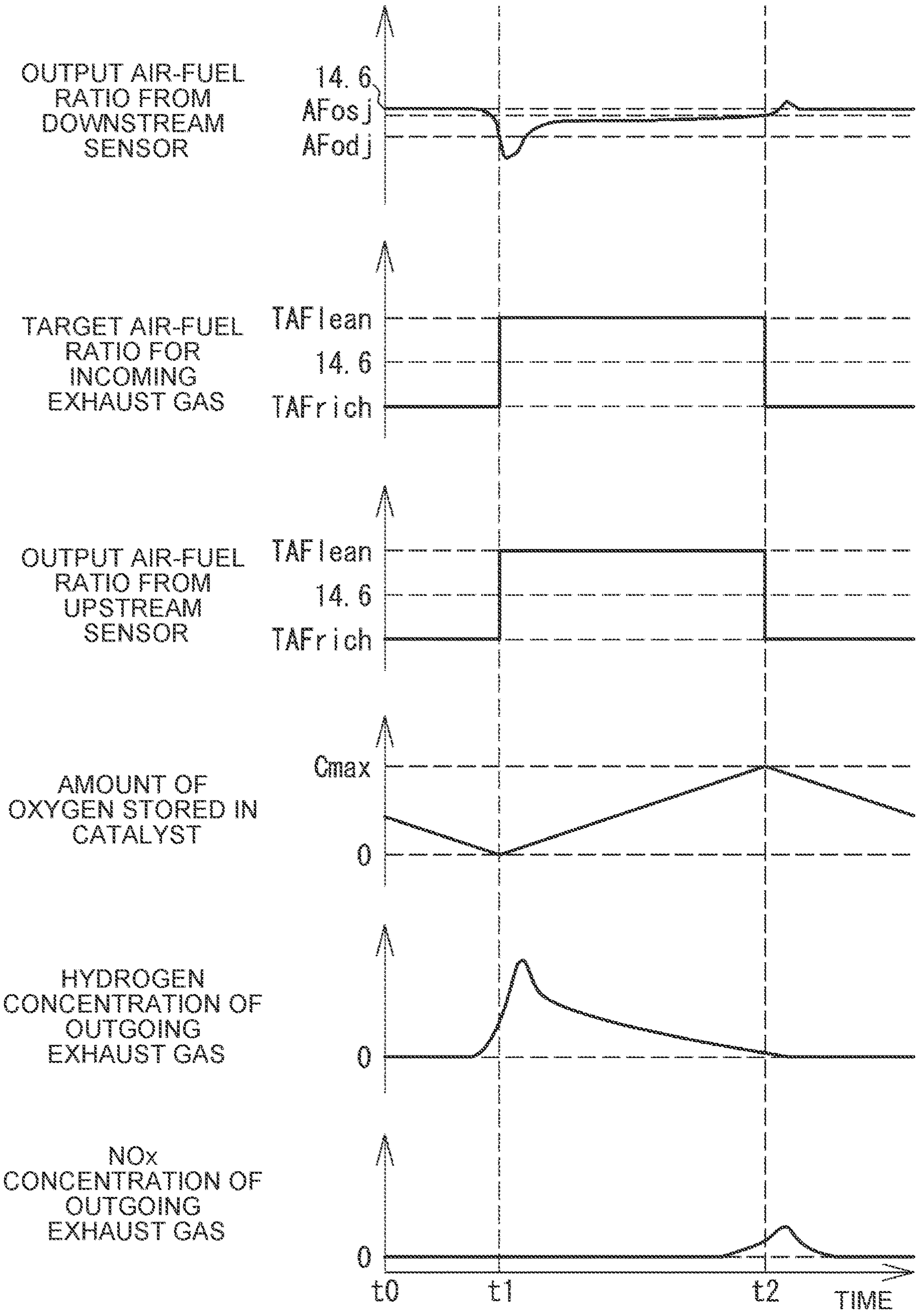
FIG. 7 is a time chart of various parameters when oxygen amount variation control according to the first embodiment of the present disclosure is performed.

The above control will be specifically described with reference to FIG. 7. FIG. 7 is a time chart of various parameters when the oxygen amount variation control according to the first embodiment of the present disclosure is performed. FIG. 7 shows, as the parameters, the output air-fuel ratio from the downstream air-fuel ratio sensor 42 (output air-fuel ratio from downstream sensor), the target air-fuel ratio for the incoming exhaust gas, the output air-fuel ratio from the upstream air-fuel ratio sensor 41 (output air-fuel ratio from upstream sensor), the amount of oxygen stored in the catalyst 20, the hydrogen concentration of the outgoing exhaust gas, and the NOx concentration of the outgoing exhaust gas.

In the example of FIG. 7, at time t0, the target air-fuel ratio for the incoming exhaust gas is set to the rich set air-fuel ratio TAFrich. Therefore, exhaust gas with an air-fuel ratio richer than the stoichiometric air-fuel ratio flows into the catalyst 20, so that the amount of oxygen stored in the catalyst 20 gradually decreases after time t0. As a result, at time t1, the output air-fuel ratio from the downstream air-fuel ratio sensor 42 decreases to an oxygen depletion determination air-fuel ratio AFodj, and the target air-fuel ratio for the incoming exhaust gas is switched from the rich set air-fuel ratio TAFrich to the lean set air-fuel ratio TAFlean. At this time, the amount of oxygen stored in the catalyst 20 is almost zero.

After time t1, exhaust gas with an air-fuel ratio leaner than the stoichiometric air-fuel ratio flows into the catalyst 20, so that the amount of oxygen stored in the catalyst 20 gradually increases. As a result, at time t2, the output air-fuel ratio from the downstream air-fuel ratio sensor 42 increases to an oxygen saturation determination air-fuel ratio AFosj, and the target air-fuel ratio for the incoming exhaust gas is switched from the lean set air-fuel ratio TAFlean to the rich set air-fuel ratio TAFrich. At this time, the output air-fuel ratio from the downstream air-fuel ratio sensor 42 has not reached the stoichiometric air-fuel ratio due to hydrogen, but the amount of oxygen stored in the catalyst has reached approximately the maximum oxygen storage capacity Cmax. By switching the target air-fuel ratio for the incoming exhaust gas at an appropriate timing in this manner, the time during which the catalyst 20 is maintained in the oxygen saturated state can be reduced, and the amount of NOx emissions can be reduced.

Flowchart of Air-Fuel Ratio Control

Figure 8:
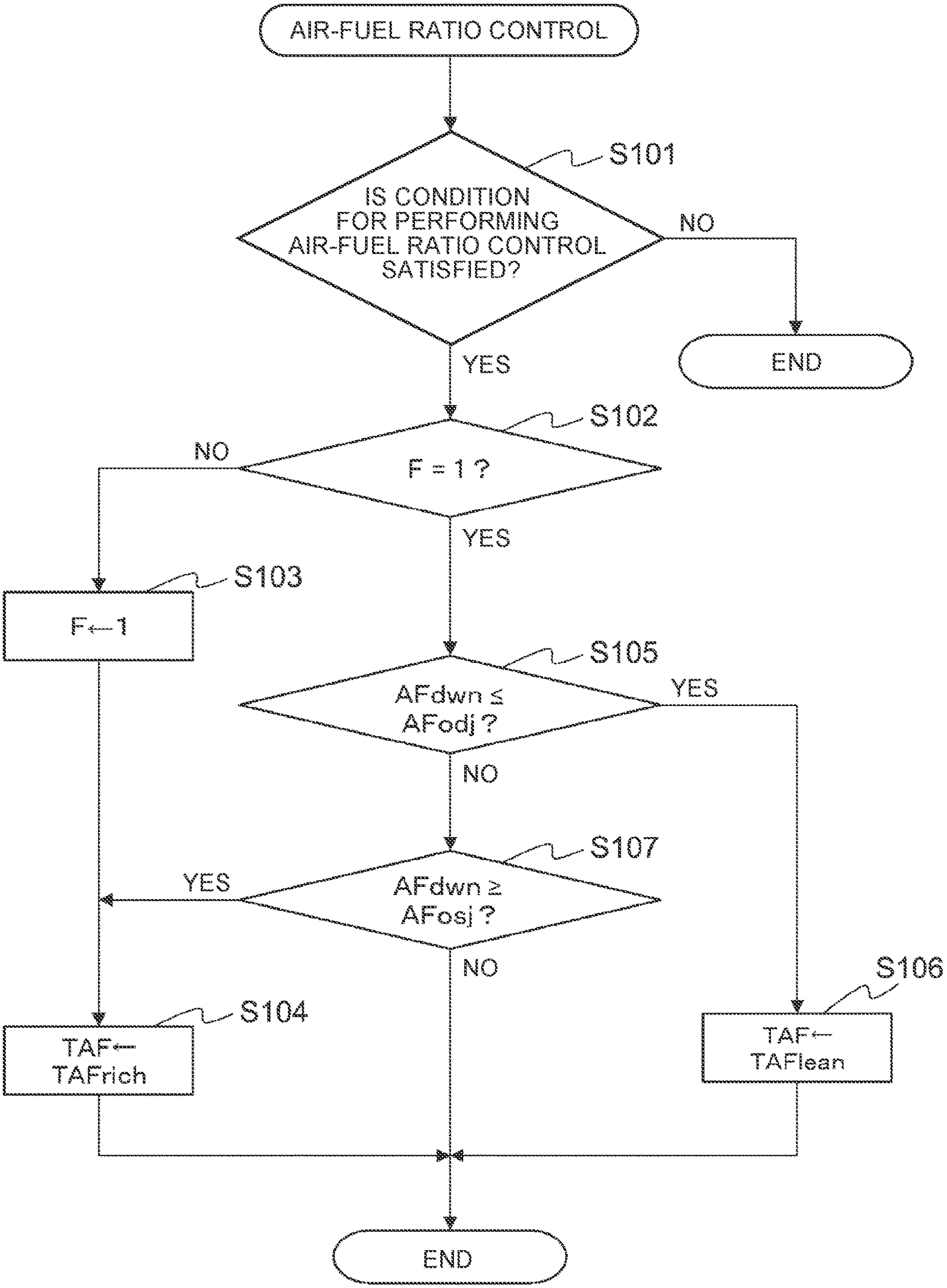
FIG. 8 is a flowchart of a control routine of air-fuel ratio control according to the first embodiment.

The above air-fuel ratio control will be described in detail below with reference to the flowchart of FIG. 8. FIG. 8 is a flowchart of a control routine of the air-fuel ratio control according to the first embodiment. This control routine is repeatedly executed by the ECU 31 at predetermined execution intervals.

First, in step S101, the air-fuel ratio control unit 61 determines whether a condition for performing the air-fuel ratio control is satisfied. For example, the condition for performing the air-fuel ratio control is satisfied when the temperature of the catalyst 20 is equal to or higher than a predetermined activation temperature and the element temperatures of the upstream air-fuel ratio sensor 41 and the downstream air-fuel ratio sensor 42 are equal to or higher than a predetermined activation temperature. For example, the temperature of the catalyst 20 is calculated based on an output from a temperature sensor provided in the catalyst 20 or in the exhaust passage near the catalyst 20, or is calculated based on a predetermined state quantity of the internal combustion engine (e.g. engine coolant temperature, amount of intake air, engine load, etc.). For example, the element temperatures of the upstream air-fuel ratio sensor 41 and the downstream air-fuel ratio sensor 42 are each calculated based on the impedance of the sensor element. For example, the condition for performing the air-fuel ratio control may include the following conditions: a predetermined time has elapsed since the internal combustion engine was started; and a predetermined component of the internal combustion engine (the fuel injection valve 11, the catalyst 20, the upstream air-fuel ratio sensor 41, the downstream air-fuel ratio sensor 42, etc.) is normal.

When it is determined in step S101 that the condition for performing the air-fuel ratio control is not satisfied, the control routine ends. When it is determined in step S101 that the condition for performing the air-fuel ratio control is satisfied, the control routine proceeds to step S102.

In step S102, the air-fuel ratio control unit 61 determines whether a control start flag F is 1. The control start flag F is a flag that is reset to zero when the internal combustion engine is started, and is set to 1 when the oxygen amount variation control is started after the internal combustion engine is started. When it is determined in step S102 that the control start flag F is zero, the control routine proceeds to step S103.

The air-fuel ratio control unit 61 sets the control start flag F to 1 in step S103 and sets the target air-fuel ratio TAF for the incoming exhaust gas to the rich set air-fuel ratio TAFrich in step S104 to start the oxygen amount variation control. The rich set air-fuel ratio TAFrich is set to a predetermined air-fuel ratio that is richer than the stoichiometric air-fuel ratio (e.g., 13.5 to 14.5). The control routine ends after step S104.

When it is determined in step S102 that the control start flag F is 1, the control routine proceeds to step S105. In step S105, the air-fuel ratio control unit 61 determines whether an output air-fuel ratio AFdwn from the downstream air-fuel ratio sensor 42 is equal to or less than the oxygen depletion determination air-fuel ratio AFodj. The oxygen depletion determination air-fuel ratio AFodj is set to a predetermined air-fuel ratio that is richer than the stoichiometric air-fuel ratio (e.g., 14.55).

When it is determined in step S105 that the output air-fuel ratio AFdwn from the downstream air-fuel ratio sensor 42 is equal to or less than the oxygen depletion determination air-fuel ratio AFodj, the control routine proceeds to step S106. In step S106, the air-fuel ratio control unit 61 sets the target air-fuel ratio TAF for the incoming exhaust gas to the lean set air-fuel ratio TAFlean. The lean set air-fuel ratio TAFlean is set to a predetermined air-fuel ratio that is leaner than the stoichiometric air-fuel ratio (e.g., 14.7 to 15.7). The control routine ends after step S106.

When it is determined in step S105 that the output air-fuel ratio AFdwn from the downstream air-fuel ratio sensor 42 is leaner than the oxygen depletion determination air-fuel ratio AFodj, the control routine proceeds to step S107. In step S107, the air-fuel ratio control unit 61 determines whether the output air-fuel ratio AFdwn from the downstream air-fuel ratio sensor 42 is equal to or higher than the oxygen saturation determination air-fuel ratio AFosj. The oxygen saturation determination air-fuel ratio AFosj is set to a predetermined air-fuel ratio that is leaner than the oxygen depletion determination air-fuel ratio AFodj and richer than the stoichiometric air-fuel ratio (e.g., 14.58).

When it is determined in step S107 that the output air-fuel ratio AFdwn from the downstream air-fuel ratio sensor 42 is equal to or higher than the oxygen saturation determination air-fuel ratio AFosj, the control routine proceeds to step S104. In step S104, the air-fuel ratio control unit 61 sets the target air-fuel ratio TAF for the incoming exhaust gas to the rich set air-fuel ratio TAFrich. The control routine ends after step S104.

When it is determined in step S107 that the output air-fuel ratio AFdwn from the downstream air-fuel ratio sensor 42 is less than the oxygen saturation determination air-fuel ratio AFosj, the control routine ends, and the target air-fuel ratio TAF for the incoming exhaust gas is maintained.

Second Embodiment

A control device for an internal combustion engine according to a second embodiment is basically the same as the control device for an internal combustion engine according to the first embodiment except for the points that will be described below. Therefore, the second embodiment of the present disclosure will be described below focusing on the differences from the first embodiment.

Figure 9:
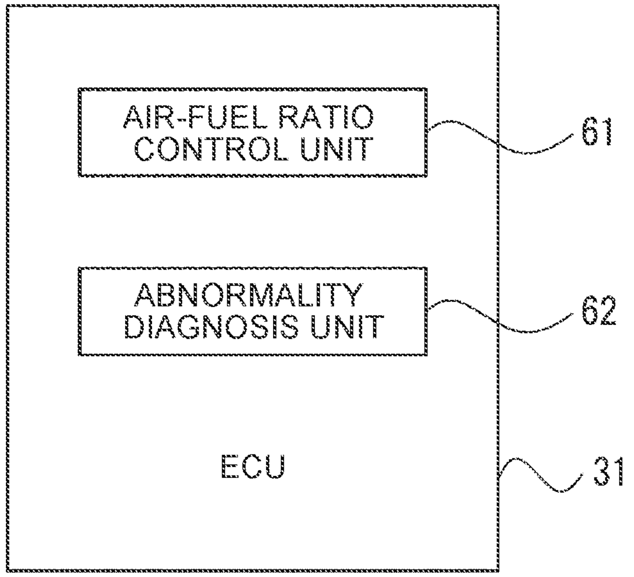
FIG. 9 is a functional block diagram of an ECU according to a second embodiment of the present disclosure.

FIG. 9 is a functional block diagram of the ECU 31 according to the second embodiment of the present disclosure. In the present embodiment, the ECU 31 includes an abnormality diagnosis unit 62 in addition to the air-fuel ratio control unit 61. The air-fuel ratio control unit 61 and the abnormality diagnosis unit 62 are functional modules that are implemented by the CPU 35 of the ECU 31 executing programs stored in the ROM 34 of the ECU 31.

The abnormality diagnosis unit 62 diagnoses an abnormality in the catalyst 20. The maximum oxygen storage capacity of the catalyst 20 may decrease with long-term use etc. The abnormality diagnosis unit 62 calculates the maximum oxygen storage capacity of the catalyst 20 in order to diagnose such an abnormality in the catalyst 20. The abnormality diagnosis unit 62 determines whether the catalyst 20 is abnormal based on the calculated maximum oxygen storage capacity. For example, the abnormality diagnosis unit 62 determines that there is an abnormality in the catalyst 20 when the calculated maximum oxygen storage capacity is less than a predetermined threshold, and determines that there is no abnormality in the catalyst 20 when the calculated maximum oxygen storage capacity is equal to or higher than the threshold.

The air-fuel ratio control unit 61 performs the oxygen amount variation control when the abnormality diagnosis unit 62 performs an abnormality diagnosis for the catalyst 20. The oxygen amount variation control is control in which the target air-fuel ratio for the incoming exhaust gas is switched between the rich set air-fuel ratio and the lean set air-fuel ratio so that the catalyst 20 changes between the oxygen depleted state and the oxygen saturated state. As in the first embodiment, in the oxygen amount variation control, the air-fuel ratio control unit 61 switches the target air-fuel ratio for the incoming exhaust gas from the lean set air-fuel ratio to the rich set air-fuel ratio when the output air-fuel ratio from the downstream air-fuel ratio sensor 42 increases to the oxygen saturation determination air-fuel ratio. The oxygen saturation determination air-fuel ratio is set to an air-fuel ratio richer than the stoichiometric air-fuel ratio. This reduces deterioration of exhaust emissions due to hydrogen when the amount of oxygen stored in the catalyst 20 is varied in order to diagnose an abnormality in the catalyst 20.

When the target air-fuel ratio for the incoming exhaust gas is maintained at the lean set air-fuel ratio in the oxygen amount variation control, the catalyst 20 changes from the oxygen depleted state to the oxygen saturated state, and the amount of oxygen stored in the catalyst 20 changes from zero to the maximum oxygen storage capacity. Therefore, the amount of oxygen stored in the catalyst 20 when the target air-fuel ratio for the incoming exhaust gas is maintained at the lean set air-fuel ratio in the oxygen amount variation control corresponds to the maximum oxygen storage capacity. Accordingly, the abnormality diagnosis unit 62 calculates the maximum oxygen storage capacity of the catalyst 20 based on the amount of oxygen stored in the catalyst 20 when the target air-fuel ratio for the incoming exhaust gas is maintained at the lean set air-fuel ratio in the oxygen amount variation control.

On the other hand, when the target air-fuel ratio for the incoming exhaust gas is maintained at the rich set air-fuel ratio in the oxygen amount variation control, the catalyst 20 changes from the oxygen saturated state to the oxygen depleted state, and the amount of oxygen stored in the catalyst 20 changes from the maximum oxygen storage capacity to zero. Therefore, the amount of oxygen released from the catalyst 20 when the target air-fuel ratio for the incoming exhaust gas is maintained at the rich set air-fuel ratio in the oxygen amount variation control corresponds to the maximum oxygen storage capacity. Accordingly, the abnormality diagnosis unit 62 may calculate the maximum oxygen storage capacity of the catalyst 20 based on the amount of oxygen stored in the catalyst 20 when the target air-fuel ratio for the incoming exhaust gas is maintained at the lean set air-fuel ratio in the oxygen amount variation control and the amount of oxygen released from the catalyst 20 when the target air-fuel ratio for the incoming exhaust gas is maintained at the rich set air-fuel ratio in the oxygen amount variation control.

For example, the abnormality diagnosis unit 62 calculates the amount of oxygen stored in the catalyst 20 or the amount of oxygen released from the catalyst 20 in the oxygen amount variation control by accumulating an oxygen excess/deficiency in the incoming exhaust gas relative to the stoichiometric air-fuel ratio. The oxygen excess/deficiency in the incoming exhaust gas relative to the stoichiometric air-fuel ratio means the amount of oxygen that is in excess or deficiency for the air-fuel ratio of the incoming exhaust gas to reach the stoichiometric air-fuel ratio. When the air-fuel ratio of the incoming exhaust gas is leaner than the stoichiometric air-fuel ratio, oxygen is stored in the catalyst 20 and the oxygen excess/deficiency has a positive value. When the air-fuel ratio of the incoming exhaust gas is richer than the stoichiometric air-fuel ratio, oxygen is released from the catalyst 20 and the oxygen excess/deficiency has a negative value.

The oxygen excess/deficiency OED is calculated by, for example, the following expression (1) based on the output from the upstream air-fuel ratio sensor 41 and the amount of fuel injection.

$$OED=0.23\times(AFup-14.6)\times Qi \quad (1)$$

In the expression (1), 0.23 is the oxygen concentration of air, 14.6 is the stoichiometric air-fuel ratio, Qi is the amount of fuel injection, and AFup is the output air-fuel ratio from the upstream air-fuel ratio sensor 41.

The oxygen excess/deficiency OED may be calculated by the following expression (2) based on the output from the upstream air-fuel ratio sensor 41 and the amount of intake air.

$$OED=0.23\times(AFup-14.6)\times Ga/AFup \quad (2)$$

In the expression (2), 0.23 is the oxygen concentration of air, 14.6 is the stoichiometric air-fuel ratio, Ga is the amount of intake air, and AFup is the output air-fuel ratio from the upstream air-fuel ratio sensor 41. The amount of intake air Ga is detected by the air flow meter 40.

Alternatively, the oxygen excess/deficiency OED may be calculated based on the target air-fuel ratio for the incoming exhaust gas without using the output from the upstream air-fuel ratio sensor 41. That is, in the above expressions (1), (2), the value of the target air-fuel ratio may be used instead of the output air-fuel ratio AFup from the upstream air-fuel ratio sensor 41. In this case, the upstream air-fuel ratio sensor 41 may be omitted from the internal combustion engine.

Figure 10:
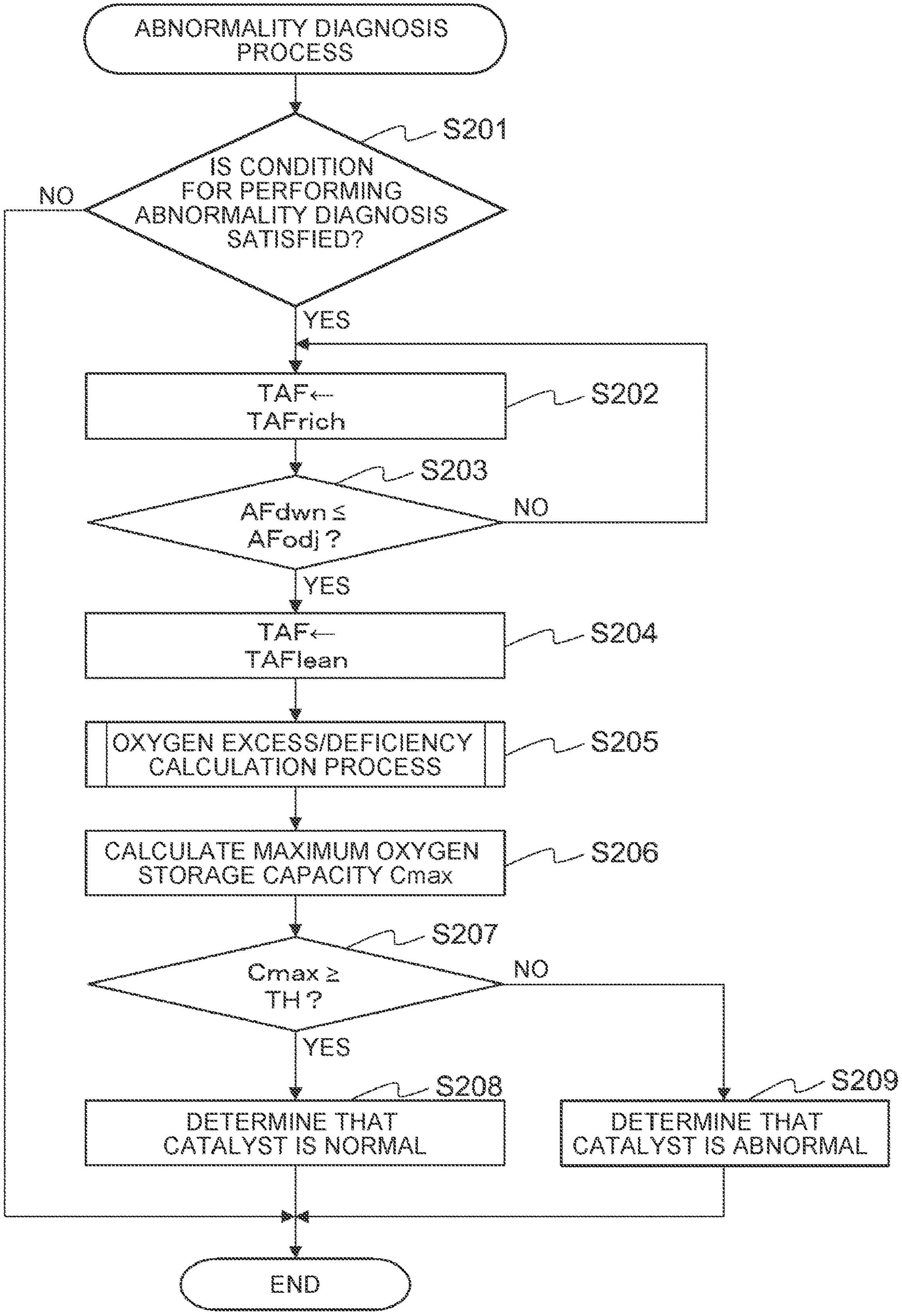
FIG. 10 is a flowchart of a control routine of an abnormality diagnosis process according to the second embodiment.

The above abnormality diagnosis for the catalyst 20 will be described in detail below with reference to the flowchart of FIG. 10. FIG. 10 is a flowchart of a control routine of an abnormality diagnosis process according to the second embodiment. This control routine is repeatedly executed by the ECU 31.

First, in step S201, the air-fuel ratio control unit 61 determines whether a condition for performing an abnormality diagnosis for the catalyst 20 is satisfied. For example, the condition for performing an abnormality diagnosis includes the following conditions: the temperature of the catalyst 20 is equal to or higher than a predetermined activation temperature; the element temperatures of the upstream air-fuel ratio sensor 41 and the downstream air-fuel ratio sensor 42 are equal to or higher than a predetermined activation temperature; and no abnormality diagnosis for the catalyst 20 has been performed since the internal combustion engine was started.

When it is determined in step S201 that the condition for performing an abnormality diagnosis for the catalyst 20 is not satisfied, the control routine ends. In this case, the air-fuel ratio control unit 61 controls the air-fuel ratio of the incoming exhaust gas according to, for example, the operating state of the internal combustion engine.

The air-fuel ratio control unit 61 may perform the oxygen amount variation control when an abnormality diagnosis for the catalyst 20 is performed, and may perform slightly rich control when an abnormality diagnosis for the catalyst 20 is not performed. The slightly rich control is control in which the air-fuel ratio of the incoming exhaust gas is controlled so that the air-fuel ratio detected by the downstream air-fuel ratio sensor 42 is maintained at a slightly rich set air-fuel ratio that is richer than the stoichiometric air-fuel ratio. As a result, even when an abnormality diagnosis for the catalyst 20 is not performed, the catalyst 20 is less likely to be in a lean atmosphere due to the deviation in output from the downstream air-fuel ratio sensor 42 caused by hydrogen. As a result, exhaust emissions can further be improved.

In this case, for example, in the slightly rich control, the air-fuel ratio control unit 61 feedback-controls the target air-fuel ratio for the incoming exhaust gas based on the output from the downstream air-fuel ratio sensor 42 so that the output air-fuel ratio from the downstream air-fuel ratio sensor 42 matches the slightly rich set air-fuel ratio. The slightly rich set air-fuel ratio is set to a predetermined air-fuel ratio that is slightly richer than the stoichiometric air-fuel ratio. For example, the slightly rich set air-fuel ratio is set to 14.50 to 14.58, preferably 14.58.

In the slightly rich control, the air-fuel ratio control unit 61 may control the air-fuel ratio of the incoming exhaust gas so that the output air-fuel ratio from the downstream air-fuel ratio sensor 42 changes within a predetermined range centered about the slightly rich set air-fuel ratio, in order to maintain the output air-fuel ratio from the downstream air-fuel ratio sensor 42 at the slightly rich set air-fuel ratio. For example, in the slightly rich control, the air-fuel ratio control unit 61 sets the target air-fuel ratio for the incoming exhaust gas to a rich set air-fuel ratio richer than the stoichiometric air-fuel ratio when the output air-fuel ratio from the downstream air-fuel ratio sensor 42 increases to an upper determination air-fuel ratio or higher, and sets the target air-fuel ratio for the incoming exhaust gas to a lean set air-fuel ratio leaner than the stoichiometric air-fuel ratio when the output air-fuel ratio from the downstream air-fuel ratio sensor 42 decreases to a lower determination air-fuel ratio or less. The upper determination air-fuel ratio and the lower determination air-fuel ratio are determined in advance so that the difference between the upper determination air-fuel ratio and the slightly rich set air-fuel ratio is equal to the difference between the lower determination air-fuel ratio and the slightly rich set air-fuel ratio and the upper determination air-fuel ratio is leaner than the lower determination air-fuel ratio. For example, the upper determination air-fuel ratio is set to a value higher than the slightly rich set air-fuel ratio by 0.01, and the lower determination air-fuel ratio is set to a value lower than the slightly rich set air-fuel ratio by 0.01.

When it is determined in step S201 that the condition for performing an abnormality diagnosis for the catalyst 20 is satisfied, the control routine proceeds to step S202. In step S202, the air-fuel ratio control unit 61 sets the target air-fuel ratio TAF for the incoming exhaust gas to the rich set air-fuel ratio TAFrich and starts the oxygen amount variation control in order to reduce the amount of oxygen stored in the catalyst 20 to zero. The rich set air-fuel ratio TAFrich is set to a predetermined air-fuel ratio that is richer than the stoichiometric air-fuel ratio (e.g., 13.5 to 14.5).

In step S203, the air-fuel ratio control unit 61 determines whether the output air-fuel ratio AFdwn from the downstream air-fuel ratio sensor 42 is equal to or less than the oxygen depletion determination air-fuel ratio AFodj. The oxygen depletion determination air-fuel ratio AFodj is set to a predetermined air-fuel ratio that is richer than the stoichiometric air-fuel ratio (e.g., 14.55). When it is determined in step S203 that the output air-fuel ratio AFdwn from the downstream air-fuel ratio sensor 42 is leaner than the oxygen depletion determination air-fuel ratio AFodj, the control routine returns to step S202, and the target air-fuel ratio TAF for the incoming exhaust gas is maintained at the rich set air-fuel ratio TAFrich.

When it is determined in step S203 that the output air-fuel ratio AFdwn from the downstream air-fuel ratio sensor 42 is equal to or less than the oxygen depletion determination air-fuel ratio AFodj, the control routine proceeds to step S204. In step S204, the air-fuel ratio control unit 61 switches the target air-fuel ratio TAF for the incoming exhaust gas from the rich set air-fuel ratio TAFrich to the lean set air-fuel ratio TAFlean. The lean set air-fuel ratio TAFlean is set to a predetermined air-fuel ratio that is leaner than the stoichiometric air-fuel ratio (e.g., 14.7 to 15.7).

Figure 11:
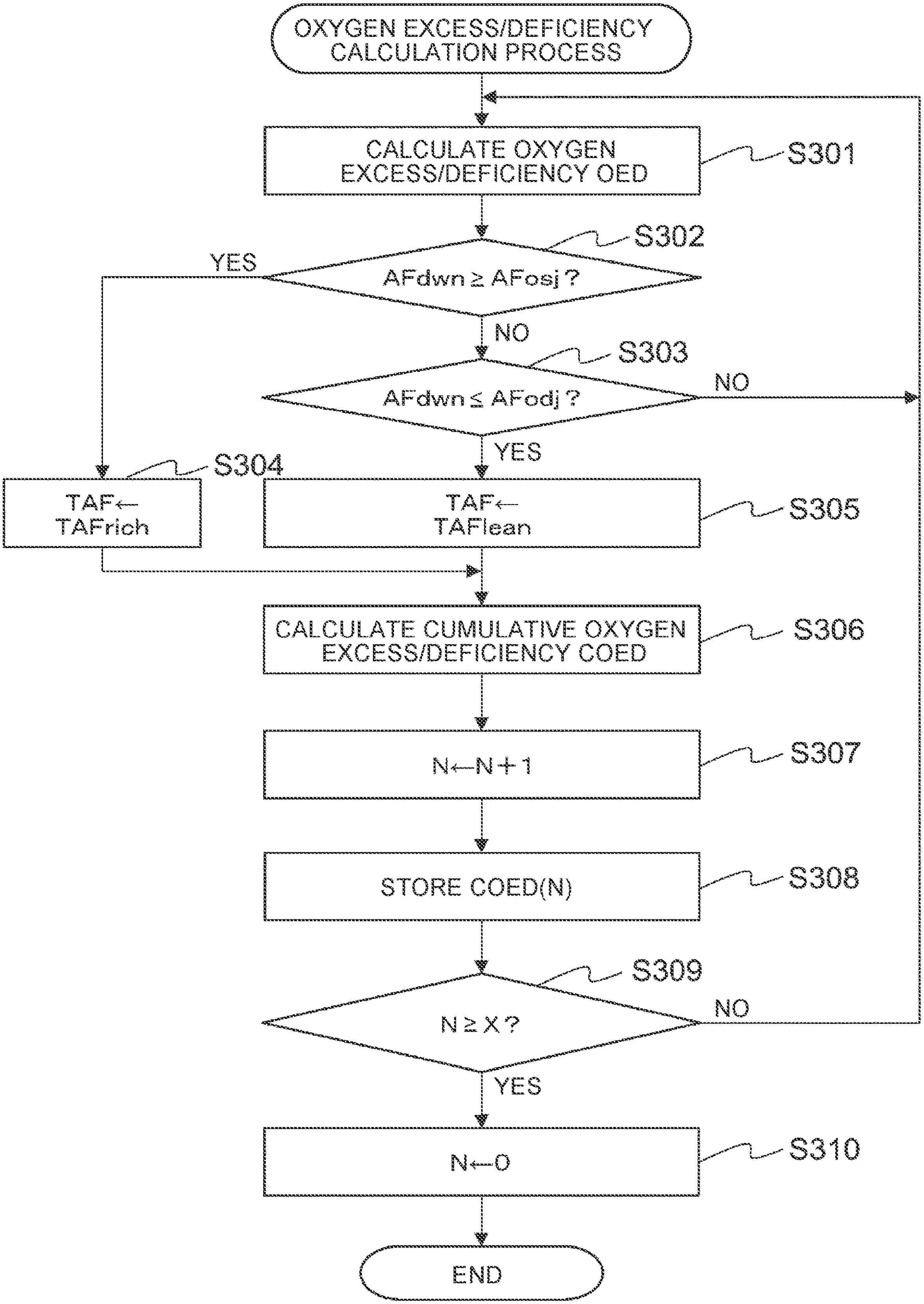
FIG. 11 is a flowchart of a control routine of an oxygen excess/deficiency calculation process according to the second embodiment.

A subroutine shown in FIG. 11 is then executed in step S205. FIG. 11 is a flowchart of a control routine of an oxygen excess/deficiency calculation process according to the second embodiment.

First, in step S301, the abnormality diagnosis unit 62 calculates the oxygen excess/deficiency OED using the above expression (1) or (2).

In step S302, the air-fuel ratio control unit 61 determines whether the output air-fuel ratio AFdwn from the downstream air-fuel ratio sensor 42 is equal to or higher than the oxygen saturation determination air-fuel ratio AFosj. The oxygen saturation determination air-fuel ratio AFosj is set to a predetermined air-fuel ratio that is leaner than the oxygen depletion determination air-fuel ratio AFodj and richer than the stoichiometric air-fuel ratio (e.g., 14.58).

When it is determined in step S302 that the output air-fuel ratio AFdwn from the downstream air-fuel ratio sensor 42 is richer than the oxygen saturation determination air-fuel ratio AFosj, the control routine proceeds to step S303. In step S303, it is determined whether the output air-fuel ratio AFdwn from the downstream air-fuel ratio sensor 42 is equal to or less than the oxygen depletion determination air-fuel ratio AFodj. When it is determined in step S303 that the output air-fuel ratio AFdwn from the downstream air-fuel ratio sensor 42 is leaner than the oxygen depletion determination air-fuel ratio AFodj, the control routine returns to step S301, and step S301 is performed again.

When it is determined in step S302 that the output air-fuel ratio AFdwn from the downstream air-fuel ratio sensor 42 is equal to or higher than the oxygen saturation determination air-fuel ratio AFosj, the control routine proceeds to step S304. In step S304, the air-fuel ratio control unit 61 switches the target air-fuel ratio TAF for the incoming exhaust gas from the lean set air-fuel ratio TAFlean to the rich set air-fuel ratio TAFrich.

When it is determined in step S303 that the output air-fuel ratio AFdwn from the downstream air-fuel ratio sensor 42 is equal to or less than the oxygen depletion determination air-fuel ratio AFodj, the control routine proceeds to step S305. In step S305, the air-fuel ratio control unit 61 switches the target air-fuel ratio TAF for the incoming exhaust gas from the rich set air-fuel ratio TAFrich to the lean set air-fuel ratio TAFlean.

After step S304 or S305, in step S306, the abnormality diagnosis unit 62 calculates a cumulative oxygen excess/deficiency COED by accumulating the absolute values of the oxygen excess/deficiency OED that had been calculated before the target air-fuel ratio was switched in step S304 or S305.

Thereafter, in step S307, the abnormality diagnosis unit 62 increments the number of calculations N by one to update the number of calculations N. The initial value of the number of calculations N when an ignition switch of the vehicle equipped with the internal combustion engine is turned on is zero.

Subsequently, in step S308, the abnormality diagnosis unit 62 stores the Nth calculated cumulative oxygen excess/deficiency COED(N) in the RAM 33 of the ECU 31 or other storage device.

The abnormality diagnosis unit 62 then determines in step S309 whether the number of calculations N is equal to or greater than a predetermined value X. The predetermined value X is set to an integer of 1 or more. When it is determined in step S309 that the number of calculations N is less than the predetermined value X, the control routine returns to step S301, and steps S301 to S308 are performed again.

When it is determined in step S309 that the number of calculations N is equal to or greater than the predetermined value X, the control routine proceeds to step S310. In step S310, the abnormality diagnosis unit 62 resets the number of calculations N to zero. After step S310, the subroutine of FIG. 11 ends, and the control routine proceeds to step S206 in FIG. 10.

In step S206, the abnormality diagnosis unit 62 calculates the maximum oxygen storage capacity Cmax of the catalyst 20. When the predetermined value X in step S309 in FIG. 11 is 1, the abnormality diagnosis unit 62 calculates the cumulative oxygen excess/deficiency COED(1) as the maximum oxygen storage capacity Cmax. That is, the abnormality diagnosis unit 62 calculates the maximum oxygen storage capacity Cmax based on the amount of oxygen stored in the catalyst 20 when the target air-fuel ratio TAF for the incoming exhaust gas is maintained at the lean set air-fuel ratio TAFlean in the oxygen amount variation control. When the predetermined value X is 2 or more, the abnormality diagnosis unit 62 calculates, for example, the average value of the cumulative oxygen excess/deficiency COED(1) to the cumulative oxygen excess/deficiency COED(X) as the maximum oxygen storage capacity Cmax. That is, the abnormality diagnosis unit 62 calculates the maximum oxygen storage capacity Cmax based on the amount of oxygen stored in the catalyst 20 when the target air-fuel ratio TAF for the incoming exhaust gas is maintained at the lean set air-fuel ratio TAFlean in the oxygen amount variation control and the amount of oxygen released from the catalyst 20 when the target air-fuel ratio TAF for the incoming exhaust gas is maintained at the rich set air-fuel ratio TAFrich in the oxygen amount variation control.

Subsequently, in step S207, the abnormality diagnosis unit 62 determines whether the maximum oxygen storage capacity Cmax is equal to or higher than a predetermined threshold TH. When it is determined that the maximum oxygen storage capacity Cmax is equal to or higher than the threshold TH, the control routine proceeds to step S208. In step S208, the abnormality diagnosis unit 62 determines that the catalyst 20 is normal. The control routine ends after step S208.

When it is determined in step S207 that the maximum oxygen storage capacity Cmax is less than the threshold TH, the control routine proceeds to step S209. In step S209, the abnormality diagnosis unit 62 determines that the catalyst 20 is abnormal. At this time, the abnormality diagnosis unit 62 may turn on a warning light in the vehicle equipped with the internal combustion engine. The abnormality diagnosis unit 62 may store a failure code corresponding to the abnormality in the catalyst 20 (decreased oxygen storage capacity) in the memory (ROM 34 or RAM 33) of the ECU 31 or other storage device. The control routine ends after step S209. In step S207, the abnormality diagnosis unit 62 may determine whether the difference between the initial value of the maximum oxygen storage capacity determined in advance for each catalyst 20 and the calculated maximum oxygen storage capacity Cmax is equal to or less than a predetermined threshold.

Third Embodiment

A control device for an internal combustion engine according to a third embodiment is basically the same as the control device for an internal combustion engine according to the second embodiment except for the points that will be described below. Therefore, the third embodiment of the present disclosure will be described below focusing on the differences from the second embodiment.

As described above, the abnormality diagnosis unit 62 calculates the maximum oxygen storage capacity of the catalyst 20 by accumulating the absolute values of the oxygen excess/deficiency obtained during the oxygen amount variation control, and determines whether there is an abnormality in the catalyst 20 based on the maximum oxygen storage capacity. However, if there is an abnormality in response characteristics of the downstream air-fuel ratio sensor 42, it takes longer for the output air-fuel ratio from the downstream air-fuel ratio sensor 42 to reach the oxygen depletion determination air-fuel ratio or the oxygen saturation determination air-fuel ratio. Therefore, the timing of switching the target air-fuel ratio for the incoming exhaust gas is delayed. As a result, the oxygen excess/deficiency will still be accumulated even after the amount of oxygen stored in the catalyst 20 reaches zero or the maximum oxygen storage capacity. Accordingly, the maximum oxygen storage capacity obtained by calculation becomes larger than the actual maximum oxygen storage capacity. That is, when the downstream air-fuel ratio sensor 42 has a delayed response, there is a possibility that the catalyst 20 may be erroneously determined to be normal even though it is abnormal.

Therefore, in the third embodiment, when the downstream air-fuel ratio sensor 42 has a delayed response, the abnormality diagnosis unit 62 determines that the catalyst 20 is abnormal even if the calculated maximum oxygen storage capacity of the catalyst 20 is equal to or higher than the threshold. This makes it possible to avoid the catalyst 20 being erroneously determined to be normal even though it is abnormal.

As shown in FIG. 7, when the target air-fuel ratio for the incoming exhaust gas is switched to the rich set air-fuel ratio, the output air-fuel ratio from the downstream air-fuel ratio sensor 42 converges to the stoichiometric air-fuel ratio and is maintained near the stoichiometric air-fuel ratio. When the downstream air-fuel ratio sensor 42 has a delayed response, it takes longer for the output air-fuel ratio from the downstream air-fuel ratio sensor 42 to converge to the stoichiometric air-fuel ratio, and it also takes longer for the output air-fuel ratio from the downstream air-fuel ratio sensor 42 to change from the stoichiometric air-fuel ratio to the oxygen depletion determination air-fuel ratio. That is, when the downstream air-fuel ratio sensor 42 has a delayed response, the output air-fuel ratio from the downstream air-fuel ratio sensor 42 is maintained near the stoichiometric air-fuel ratio for a shorter period of time when the target air-fuel ratio for the incoming exhaust gas is set to the rich set air-fuel ratio is reduced.

Therefore, even if the calculated maximum oxygen storage capacity is equal to or higher than the threshold, the abnormality diagnosis unit 62 determines that the downstream air-fuel ratio sensor 42 has a delayed response and that the catalyst 20 is abnormal, when the ratio of the period during which the output air-fuel ratio from the downstream air-fuel ratio sensor 42 is maintained near the stoichiometric air-fuel ratio to the period during which the target air-fuel ratio for the incoming exhaust gas is maintained at the rich set air-fuel ratio in the oxygen amount variation control is less than a predetermined value.

Figure 12:
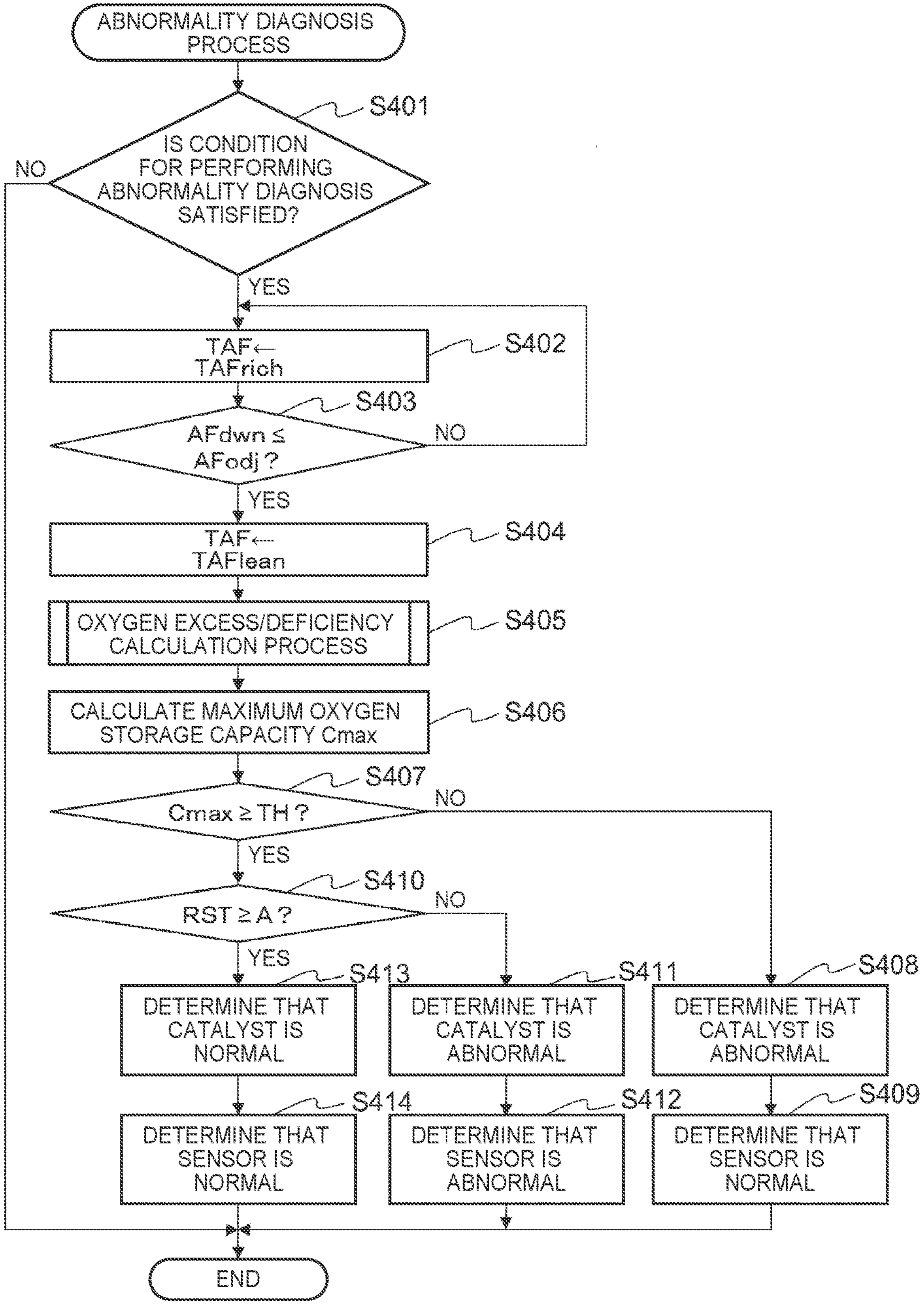
FIG. 12 is a flowchart of a control routine of an abnormality diagnosis process according to a third embodiment.

FIG. 12 is a flowchart of a control routine of an abnormality diagnosis process according to the third embodiment. This control routine is repeatedly executed by the ECU 31.

Figure 13:
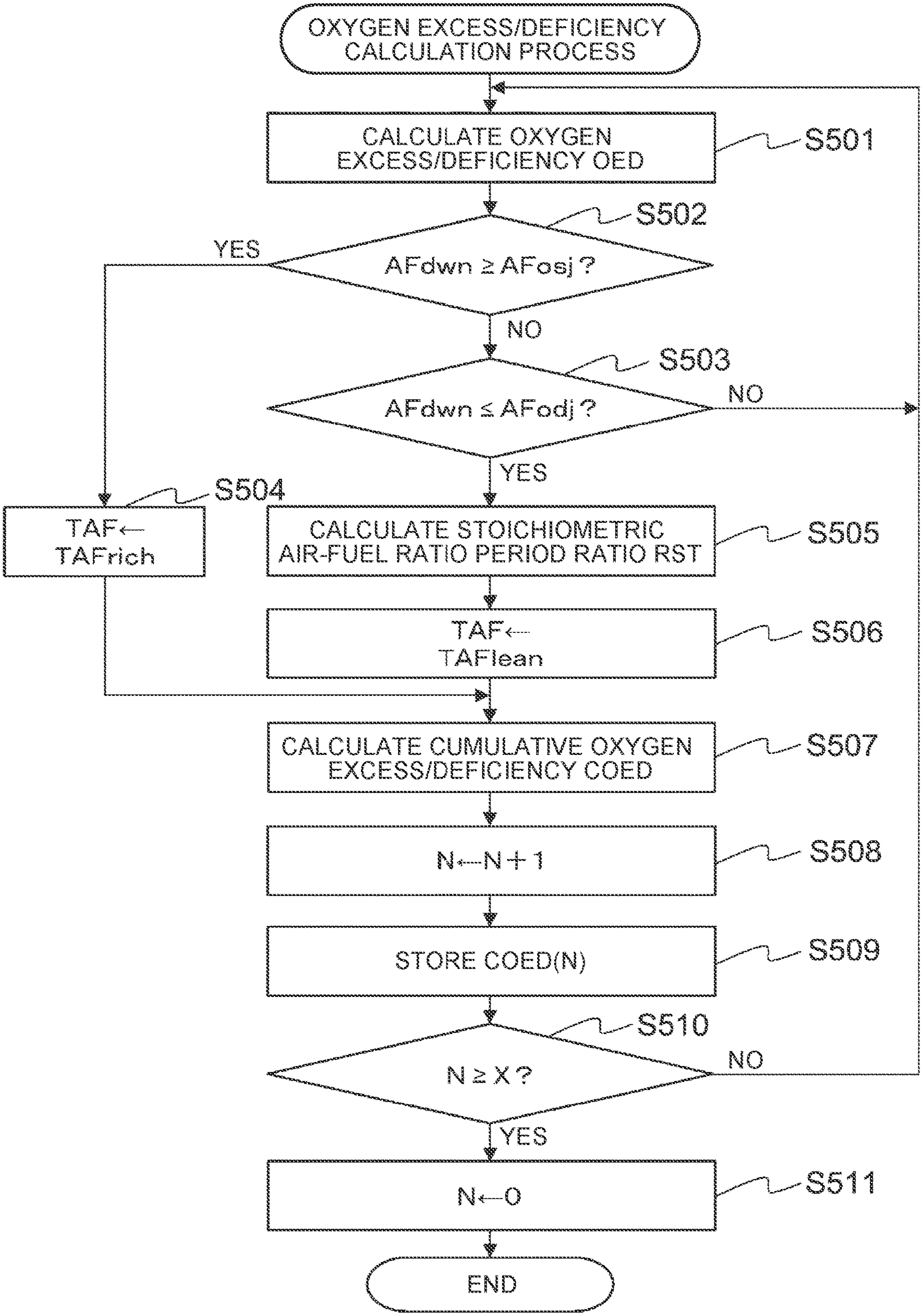
FIG. 13 is a flowchart of a control routine of an oxygen excess/deficiency calculation process according to the third embodiment.

Steps S401 to S404 are performed in the same manner as steps S201 to S204 in FIG. 10, and a subroutine shown in FIG. 13 is executed in step S405. FIG. 13 is a flowchart of a control routine of an oxygen excess/deficiency calculation process according to the third embodiment.

Steps S501 to S504 are performed in the same manner as steps S301 to S304 in FIG. 11. When it is determined in step S503 that the output air-fuel ratio AFdwn from the downstream air-fuel ratio sensor 42 is equal to or less than the oxygen depletion determination air-fuel ratio AFodj, the control routine proceeds to step S505.

In step S505, the abnormality diagnosis unit 62 calculates the ratio of the period during which the output air-fuel ratio AFdwn from the downstream air-fuel ratio sensor 42 is maintained near the stoichiometric air-fuel ratio to the period during which the target air-fuel ratio TAF for the incoming exhaust gas is maintained at the rich set air-fuel ratio TAFrich (hereinafter referred to as "stoichiometric air-fuel ratio period ratio RST"). The period from when the target air-fuel ratio TAF for the incoming exhaust gas is set to the rich set air-fuel ratio TAFrich in step S504 to when it is determined in step S503 that the output air-fuel ratio AFdwn from the downstream air-fuel ratio sensor 42 has reached the oxygen depletion determination air-fuel ratio AFodj corresponds to the period during which the target air-fuel ratio TAF for the incoming exhaust gas is maintained at the rich set air-fuel ratio TAFrich. The abnormality diagnosis unit 62 determines that the output air-fuel ratio AFdwn from the downstream air-fuel ratio sensor 42 is maintained near the stoichiometric air-fuel ratio when, for example, the output air-fuel ratio AFdwn from the downstream air-fuel ratio sensor 42 is maintained between a value slightly leaner than the stoichiometric air-fuel ratio (e.g., 14.62) and a value slightly richer than the stoichiometric air-fuel ratio (e.g., 14.58).

After step S505, in step S506, the abnormality diagnosis unit 62 sets the target air-fuel ratio TAF for the incoming exhaust gas to the lean set air-fuel ratio TAFlean. Steps S507 to S511 are performed in the same manner as steps S306 to S310 in FIG. 11. In step S510, the predetermined value X is set to an integer of 2 or more. That is, in the third embodiment, the abnormality diagnosis unit 62 calculates the maximum oxygen storage capacity of the catalyst 20 based on the amount of oxygen stored in the catalyst 20 when the target air-fuel ratio TAF for the incoming exhaust gas is maintained at the lean set air-fuel ratio TAFlean in the oxygen amount variation control and the amount of oxygen released from the catalyst 20 when the target air-fuel ratio TAF for the incoming exhaust gas is maintained at the rich set air-fuel ratio TAFrich in the oxygen amount variation control.

After step S511, the subroutine of FIG. 13 ends, and the control routine proceeds to step S406 in FIG. 12. In step S406, the abnormality diagnosis unit 62 calculates the maximum oxygen storage capacity Cmax of the catalyst 20. For example, the abnormality diagnosis unit 62 calculates the average value of the cumulative oxygen excess/deficiency COED(1) to the cumulative oxygen excess/deficiency COED(X) as the maximum oxygen storage capacity Cmax.

Subsequently, in step S407, the abnormality diagnosis unit 62 determines whether the maximum oxygen storage capacity Cmax is equal to or higher than a predetermined threshold TH. When it is determined that the maximum oxygen storage capacity Cmax is less than the threshold TH, the control routine proceeds to step S408. In step S408, the abnormality diagnosis unit 62 determines that the catalyst 20 is abnormal. At this time, the abnormality diagnosis unit 62 may turn on a warning light in the vehicle equipped with the internal combustion engine. The abnormality diagnosis unit 62 may store a failure code corresponding to the abnormality in the catalyst 20 (decreased oxygen storage capacity) in the memory (ROM 34 or RAM 33) of the ECU 31 or other storage device.

Subsequently, in step S409, the abnormality diagnosis unit 62 determines that the downstream air-fuel ratio sensor 42 is normal. The control routine ends after step S409.

When it is determined in step S407 that the maximum oxygen storage capacity Cmax is equal to or higher than the threshold TH, the control routine proceeds to step S410. In step S410, the abnormality diagnosis unit 62 determines whether the stoichiometric air-fuel ratio period ratio RST is equal to or greater than a predetermined value A. When the predetermined value X in step S510 in FIG. 13 is 4 or more, that is, when the stoichiometric air-fuel ratio period ratio RST is calculated a plurality of times, it is determined whether the average value of the values obtained by the plurality of calculations is equal to or greater than the predetermined value A.

When it is determined that the stoichiometric air-fuel ratio period ratio RST is less than the predetermined value A, the control routine proceeds to step S411. In step S411, the abnormality diagnosis unit 62 determines that the catalyst 20 is abnormal. At this time, the abnormality diagnosis unit 62 may turn on a warning light in the vehicle equipped with the internal combustion engine. The abnormality diagnosis unit 62 may store a failure code corresponding to the abnormality in the catalyst 20 (decreased oxygen storage capacity) in the memory (ROM 34 or RAM 33) of the ECU 31 or other storage device.

Subsequently, in step S412, the abnormality diagnosis unit 62 determines that the downstream air-fuel ratio sensor 42 is abnormal. At this time, the abnormality diagnosis unit 62 may store a failure code corresponding to the abnormality in the downstream air-fuel ratio sensor 42 (delayed response) in the memory (ROM 34 or RAM 33) of the ECU 31 or other storage device. The control routine ends after step S412.

When it is determined in step S410 that the stoichiometric air-fuel ratio period ratio RST is equal to or greater than the predetermined value A, the control routine proceeds to step S413. In step S413, the abnormality diagnosis unit 62 determines that the catalyst 20 is normal. Subsequently, in step S414, the abnormality diagnosis unit 62 determines that the downstream air-fuel ratio sensor 42 is normal. The control routine ends after step S414.

In step S407, the abnormality diagnosis unit 62 may determine whether the difference between the initial value of the maximum oxygen storage capacity determined in advance for each catalyst 20 and the calculated maximum oxygen storage capacity Cmax is equal to or less than a predetermined threshold.

Other Embodiments

Although the preferred embodiments of the present disclosure have been described above, the present disclosure is not limited to these embodiments, and various modifications and alterations can be made within the scope of the claims. For example, a downstream catalyst that is similar to the catalyst 20 may be disposed in the exhaust passage downstream of the catalyst 20 in the internal combustion engine. The rich set air-fuel ratio and the lean set air-fuel ratio in the oxygen amount variation control need not necessarily be fixed values.

What is claimed is:

1. A control device for an internal combustion engine, the control device comprising:

a catalyst located in an exhaust passage and configured to store oxygen;

an air-fuel ratio sensor configured to detect an air-fuel ratio of exhaust gas flowing out of the catalyst; and one or more electronic control units configured to control an air-fuel ratio of incoming exhaust gas flowing into the catalyst, wherein the one or more electronic control units are configured to perform oxygen amount variation control in which a target air-fuel ratio for the incoming exhaust gas is switched between a rich set air-fuel ratio that is richer than a stoichiometric air-fuel ratio and a lean set air-fuel ratio that is leaner than the stoichiometric air-fuel ratio, set the target air-fuel ratio to the lean set air-fuel ratio when the air-fuel ratio detected by the air-fuel ratio sensor is equal to or less than a predetermined oxygen depletion determination air-fuel ratio in the oxygen amount variation control, and set the target air-fuel ratio to the rich set air-fuel ratio when the air-fuel ratio detected by the air-fuel ratio sensor is equal to or higher than a predetermined oxygen saturation determination air-fuel ratio in the oxygen amount variation control, wherein the oxygen depletion determination air-fuel ratio is an air-fuel ratio richer than the stoichiometric air-fuel ratio, and the oxygen saturation determination air-fuel ratio is leaner than the oxygen depletion determination air-fuel ratio and richer than the stoichiometric air-fuel ratio.

2. The control device according to claim 1, wherein the one or more electronic control units are configured to perform an abnormality diagnosis in which a maximum oxygen storage capacity of the catalyst is calculated based on an amount of oxygen stored in the catalyst when the target air-fuel ratio is maintained at the lean set air-fuel ratio in the oxygen amount variation control and whether the catalyst is abnormal is determined based on the maximum oxygen storage capacity.

3. The control device according to claim 2, wherein the one or more electronic control units are configured to perform the oxygen amount variation control when the abnormality diagnosis is performed, and to perform slightly rich control when the abnormality diagnosis is not performed, the slightly rich control being control in which the air-fuel ratio of the incoming exhaust gas is controlled in such a manner that the air-fuel ratio detected by the air-fuel ratio sensor is maintained at a slightly rich air-fuel ratio that is richer than the stoichiometric air-fuel ratio.

4. The control device according to claim 2, wherein the one or more electronic control units are configured to calculate the maximum oxygen storage capacity of the catalyst based on the amount of oxygen stored in the catalyst when the target air-fuel ratio is maintained at the lean set air-fuel ratio in the oxygen amount variation control and an amount of oxygen released from the catalyst when the target air-fuel ratio is maintained at the rich set air-fuel ratio in the oxygen amount variation control, determine that the catalyst is abnormal when the maximum oxygen storage capacity is less than a predetermined threshold, and determine that the catalyst is abnormal when the maximum oxygen storage capacity is equal to or higher than the threshold and a ratio of a period during which the air-fuel ratio detected by the air-fuel ratio sensor is maintained near the stoichiometric air-fuel ratio to a period during which the target air-fuel ratio is maintained at the rich set air-fuel ratio in the oxygen amount variation control is less than a predetermined value.

5. A catalyst abnormality diagnosis method for diagnosing an abnormality in a catalyst located in an exhaust passage of an internal combustion engine and configured to absorb oxygen, the catalyst abnormality diagnosis method comprising:

detecting an air-fuel ratio of exhaust gas flowing out of the catalyst;

setting a target air-fuel ratio for incoming exhaust gas flowing into the catalyst to a lean set air-fuel ratio that is leaner than a stoichiometric air-fuel ratio when the detected air-fuel ratio is equal to or less than a predetermined oxygen depletion determination air-fuel ratio;

setting the target air-fuel ratio to a rich set air-fuel ratio that is richer than the stoichiometric air-fuel ratio when the detected air-fuel ratio is equal to or higher than a predetermined oxygen saturation determination air-fuel ratio;

calculating a maximum oxygen storage capacity of the catalyst based on an amount of oxygen stored in the catalyst when the target air-fuel ratio is maintained at the lean set air-fuel ratio; and determining whether the catalyst is abnormal based on the maximum oxygen storage capacity, wherein the oxygen depletion determination air-fuel ratio is an air-fuel ratio richer than the stoichiometric air-fuel ratio, and the oxygen saturation determination air-fuel ratio is leaner than the oxygen depletion determination air-fuel ratio and richer than the stoichiometric air-fuel ratio.

* * * * *